3,763,182
METHOD FOR PRODUCING METAL PHTHALO-
CYANINE TYPE PIGMENT
Shojiro Horiguchi, Shozo Ohira, Yoshio Abe, and Tohoru Hosoda, Tokyo, Japan, assignors to Dainichiseika Color & Chemicals Mfg. Co., Ltd., Tokyo, Japan
No Drawing. Filed Feb. 10, 1970, Ser. No. 10,269
Int. Cl. C09b 47/04
U.S. Cl. 260—314.5
16 Claims

ABSTRACT OF THE DISCLOSURE

Method for producing a metal phthalocyanine type pigment which comprises subjecting an o-dinitrile type compound and a metallic substance capable of forming a central nucleus of the phthalocyanine type pigment to condensation reaction at a low temperature in the presence of an alkaline substance selected from the group consisting of hydroxide, oxide, peroxide and carbonate of alkali metal and of alkaline earth metal, a compound capable of forming a complex compound with the metal of the metallic substance capable of forming a central nucleus of the phthalocyanine type pigment and a hydrophilic organic solvent having hydroxyl radical. By this method, products having clear color tone, fine crystal state, large coloring power, soft texture and superior resistance to heat can be obtained easily with a high yield without the necessity of after treatment of pigmentation.

FIELD OF THE INVENTION

This invention relates to a novel method for producing metal phthalocyanine type pigments and metal phthalocyanine pigments so produced.

BACKGROUND OF THE INVENTION

Heretofore, among phthalocyanine type pigments metal phthalocyanine type and metal halogeno-substituted phthalocyanine type pigments including copper phthalocyanine as a most useful principal member have been known. These pigments have blue to green hues and since their fastness to light, resistances to heat, various chemicals and the like are superior, they are evaluated highly as coloring agents for various articles. They are employed as coloring agents in a wide variety of applications such as printing ink, paint, synthetic resin, woven fabrics, stationeries, etc.; and their demand is showing steady increase year after year.

Metal phthalocyanine type pigments among phthalocyanine type pigments having such superior properties and useful in wide variety of application field, are produced by following methods.

(1) A so-called urea method which comprises subjecting a mixture of phthalic anhydride, phthalimide or derivatives thereof, a metal capable of forming a central nucleus of phthalocyanine type pigments or a compound of such a metal, urea and a catalyser such as boric acid, $AS_2O_5$, $3(NH_4)_2O \cdot 7MoO_3 \cdot 4H_2O$ or the like to condensation reaction at 200–300° C.

(2) A so-called phthalodinitrile method which comprises subjecting a mixture of phthalodinitrile or its derivatives and a metal capable of forming a central nucleus of phthalocyanine type pigments or a compound of such a metal at a high temperature of 180° C.–300° C.

Since the metal phthalocyanine type pigments produced by a method such as those above-mentioned are hard blocks of large coarse particles, their color tone is not clear, they are poor in coloring power and hence can hardly be employed in the practical use as pigments.

In order to give pigmental aptitude such as coloring power, clearness, etc. to metal phthalocyanine type pigments produced according to the above-mentioned methods and to make them useful as pigments, a processing step for pigmentation such as a so-called acid paste or acid slurry method which comprises dissolving the crude product just after production according to the above-mentioned method in an acid such as concentrated or fuming sulfuric acid or wetting the former with the latter and then pouring the solution or slurry into a large amount of water to reprecipitate it into fine state or a method which comprises adding mechanical shock to crude products of metal phthalocyanine type pigment to pulverize them, has been indispensable in the production.

The acid slurry method or the acid paste method possess extreme drawbacks when actually used in commerce because a large amount of acid must be used to dissolve or wet resultant crude products, or because removal or disposal of acids from the pigments after reprecipitation in water, corrosion of apparatus must be considered.

In cases of the method which utilizes mechanical shock as in ball-milling method, operation is so complicated, requires such a long time and a large amount of power and the processing amount per lot is so small that it is considered extremely inefficient, non-productive and disadvantageous for a large scale commercial production.

Further, common metal phthalocyanine type pigments, once pulverized, tend to cause recohesion in the subsequent step to form very hard, secondary and tertiary particles, which are hard to crush. Therefore, a great deal of mechanical energy is required to finely and uniformly disperse them. Even with the expense of such a great deal of mechanical energy it is almost impossible to put them back to the state of primary particle fresh from production. Thus relatively coarse particles become the cause of poor dispersion, reduction of coloring power, dullness of tone and further bad influences given upon various properties of to-be-colored materials.

Metal phthalocyanine type pigments appear in various kinds of crystallographical forms, showing polymorphism. With regard to copper phthalocyanine pigments, 4 crystal forms, α-type (stable), β-type (unstable), γ-type (unstable) and δ-type (unstable) are known.

With regard to cobalt and nickel phthalcyanine also, there are known α-, β-, and γ-types. These crystallographically different types have their own characteristic properties. In case of copper phthalocyanine, α-type (stable) is stable against organic solvents, particularly against aromatic solvents but three kinds of β-type (unstable), γ-type and δ-type are unstable crystals and turned to α-type by crystallographical transformation in an aromatic solvent. As for hue, α-type is blue with the strongest yellow tint but β-, γ- and δ-types are of reddish blue. These 4 kinds of crystal forms have crystallographically their own characteristic properties but at present the pigments having α- and β-types are being used widely in commerce. On account of the above-mentioned property, β-type, compared with α-type, is not suitable for the use in a vehicle containing an aromatic solvent.

As for the production method of copper phthalocyanine pigments having an α-type (stable) crystallographic form, there have been known heretofore various methods. For example they can be obtained by pigmentation processing such as a method in which the crude copper phthalocyanine pigment obtained by the above-mentioned urea method or phthalodinitrile method is pulverized by applying mechanical shock (e.g., ball-milling in a small amount of an organic solvent).

However, since the operation of such a method is so complicated, since it requires a long-time and a large amount of power and since the processing amount per lot is small, this method is extremely disadvantageous for a large scale commercial production.

The pigment obtained by this method is extremely hard and difficult-to-crush and requires a great deal of mechanical energy for finely dispersing in a vehicle. In addition, it is almost impossible to put it back to original primary particle as produced. On this account, it is often accompanied with the cause of bad influence upon various properties of to-be-colored substances such as poor dispersion reduction of coloring power, and dullness of tone.

For producing copper phthalocyanine pigments having a β-type (unstable) crystallographic form, a method in which the crude copper phthalocyanine pigment is dissolved in or wetted with an acid such as sulfuric acid and then poured into a large amount of water to be reprecipitated (acid paste method or acid slurry method), is used to obtain pigments having a practical value by pigmentation.

This pigmentation processing, e.g. the above-mentioned acid paste method uses a large amount of acid (e.g., 10 to 20 times the amount of crude pigment); hence when it is used commercially, the problem of corrosion of reaction apparatus, treatment of spent liquor, water washing carried out for a long period of time to remove acid from resultant pigment have been important drawbacks.

For producing a copper phthalocyanine having a γ-type (unstable) crystallographic form, the crude copper pthalocyanine is further mixed with 98% by weight of sulfuric acid, diluted to 65% by weight of sulfuric acid by the addition of water and then poured into a large amount of water to obtain pigments by reprecipitation. However, this pigmentation processing utilizes a large amount of acid and in addition, control of hue is extremely difficult and only products of low coloring powder and unclear hue are obtained. Hence the application field of product is limited.

Among phthalocyanine type pigment metal halogenated phthalocyanine pigments have been produced heretofore by the following methods.

(1) A method in which a phthalocyanine type pigment is halogenated with a halogen or a halogenating agent in the presence of a solvent such as an eutectic mixture of aluminum chloride and sodium chloride, phthalic anhydride, trichlorobenzene etc. at a high temperature of about 200° C.

(2) A method in which a mixture of halogenated phthalic anhydride, halogenated phthalic imide or halogenated phthalodinitrile, a metal or its compound, urea and a small amount of catalyst (e.g. 3(NH$_4$)$_2$

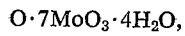

TiCl$_4$, ZrCl$_4$, etc.) is heated and reacted at 200°–300° C.

(3) A method in which halogenated phthalodinitrile, and a metal or its compound is heated and reacted at 200–300° C. in an inert highly-boiling aromatic solvent.

Among these conventional methods the method (1) gives products of clearer hue compared with the methods (2) and (3) but required an extremely long time for halogenation. Moreover it has drawbacks such as difficulty of quality control for producing products of constant hue, corrosion of reaction apparatus by a halogenating agent, relatively low reaction yield of halogenated phthalocyanine and necessity of extremely complicated absorption apparatus for unreacted halogenating agent.

Further the methods (2) and (3) have drawbacks in the points that a side-reaction is liable to occur, and production of products of clear hue is difficult because complete removal of impurities is impossible even when purification is attempted after reaction.

The metal halogenated phthalocyanine type pigments produced according to the above-mentioned conventional methods, are unclear in color tone, poor in coloring power and hardly be used in practical purpose because of being coarse hard particles. Accordingly, as in case of the above-mentioned copper phthalocyanine, a pigmentation processing step such as a method, for example, acid paste method or acid slurry method, in which crude product obtained by one of the above-mentioned method is dissolved in or wetted with an acid such as concentrated sulfuric acid, fuming sulfuric acid or chloro-sulfuric acid and then poured into a large amount of water to reprecipitate into finely divided state, has been indispensable in the production.

In the practical application of the above-mentioned pigmentation processing step, a large amount of acid must be used to dissolve or wet resultant crude products and there are further drawbacks in the removal of acid from the pigments after reprecipitation, and corrosion of the apparatus for the disposal of it.

Further, metal halogenated phthalocyanine type pigments once pulverized, also tend to cause recohesion in the subsequent step to form very hard, hard-to-crush secondary and tertiary particles. On this account, a great deal of mechanical energy is required to finely and uniformly disperse them. Even with the expense of such a great deal of mechanical energy, it is almost impossible to put them back to the state of primary particle fresh from production. Thus, relatively coarse particles become the cause of poor dispersion, reduction of coloring power, dullness of hue and further bad influeunces given upon various properties of to-be-colored materials.

Besides the above-mentioned method for producing phthalocyanine type pigments there is known a method in which 3-iminoisoindoleines having a substituent at the 1 position, is printed or padded on fibers and the resultant fibers are subjected to heat treatment preferably in the presence of a reducing agent to form a phthalocyanine type dye on the fibers. This however is not a method for producing a phthalocyanine type pigment itself with a high yield. It is only a method for forming a phthalocyanine type dye on the spots of fibers.

After comprehensive studies carried out by the present inventors to overcome the above-mentioned drawbacks of conventional methods for producing metal phthalocyanine pigments, a method for producing a metal phthalocyanine type pigment has been previously proposed also by the present inventors. That method comprises subjecting an o-dinitrile type compound and a metallic substance capable of forming a central nucleus of phthalocyanine type pigment, to a condensation reaction at a low temperature in the presence of an alkaline substance selected from the group consisting of hydroxides, oxides, peroxides and carbonates of alkali metal or alkaline earth metal, and in a hydrophilic, organic solvent having hydroxyl group.

According to this method, metal phthalocyanine type pigments can be produced by condensation reaction at a lower temperature compared with those of the conventional methods for producing metal phthalocyanine type pigments. Further, this method has another advantage that metal phthalocyanine type pigments of α-type (stable), β-type (unstable) or γ-type can be easily produced by adding a suitable solvent at that time or by a simple after-treatment, without resorting to the conventional pigmentation processing such as an acid paste method, an acid slurry method, a ball milling method or the like.

However, from a commercial viewpoint, further improvements of the method are desired. For example, improvements in reaction conditions such as lowering of condensation temperature, shortening of condensation time or the like, improvement of color tone of resuultant pigments or increase of yield.

DETAILED DESCRIPTION OF THE INVENTION

An object of the present invention is to provide a method for producing metal phthalocyanine type pigments which enables the lowering of the condensation temperature, shortens the condensation time, improves color tone and increases the yield.

After strenuous studies, it has been found by the present inventors that if a compound which can form a complex compound by the combination with a metal capable of forming a central nucleus of phthalocyanine type pigment, besides the alkaline substance, is incorporated, phthalocyanine pigments having a clearer color tone can be produced under milder conditions, i.e. at a lower temperature and for a shorter time. and in a higher yield, compared with the above-mentioned original method for producing phthalocyanine type pigments.

The present invention thus consists in a method for producing metal phthalocyanine type pigments which comprises subjecting an o-dinitrile type compound and a metallic substance capable of forming a central nucleus of a phthalocyanine type pigment to a condensation reaction at a low temperature, in the coexistence of an alkaline substance selected from the group consisting of hydroxides, oxides, peroxides and carbonates of alkali metal or alkaline earth metal, and a compound which can form a complex compound by the combination with said metallic substance capable of forming a central nucleus of phthalocyanine type pigment, and in a hydrophilic, organic solvent having hydroxyl group.

The term "metallic substance" is used herein to express a metal and a compound of the metal.

According to the method of the present invention, since the starting materials of an o-dinitrile type compound and a metal capable of forming a central nucleus of phthalocyanine type pigment are directly reacted at a low temperature, pigments containing no impurities are obtained in finely divided state. Since the present method does not require pigmentation processing as required in the conventional methods, operation and apparatus for the production are simpler, and the pigment can be produced within an extremely shorter processing time, with a better efficiency and a higher yield. Further since the particles of the resultant products are extremely soft, dispersibility is good, and coloring power is large, superior effects are thereby imparted with regard to various fastness of colored products.

Thus the present method is a very valuable method in the commercial application because it gives a superior colored product which can be utilized in wide variety of field.

The o-dinitrile type compounds used in the method of the present invention are represented by a general formula

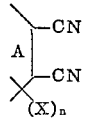

wherein A is aryl or heterocyclic radical, X is hydrogen or halogen atom, nitro, amino, sulfonic acid, carboxylic acid, alkyl, or alkoxyl radical and $n$ is an integer of 1–4 and include aromatic dinitrile compounds such as phthalodinitrile, 3,4-dinitrile diphenyl, 1,2-dinitrile naphthalene, 2,3-dinitrile naphthalene, 2,3-dinitrile anthracene, 2,3-dinitrile phenanthrene and the like, halogen substituted dinitrile compounds such as mono-, di-, tri- or tetra-chlorophthalodinitrile, mono-, di-, tri- or tetra-bromophthalodinitrile, mono-, di-, tri- or tetra-iodophthalodinitrile and the like, sulfonic acid-substituted phthalodinitrile compounds, carboxylic acid-substituted phthalodinitrile compounds such as carboxylic acid phthalodinitrile and the like, nitro-substituted phthalodinitrile compounds, amino-substituted phthalodinitrile compounds, alkyl-substituted phthalodinitrile compounds such as methyl phthalodinitrile, ethyl phthalodinitrile and the like, alkoxy phthalodinitrile compounds such as methoxy phthalodinitrile, ethoxy phthalodinitrile and the like and heterocyclic dinitrile compounds such as 2,3-dinitrile pyridine and the like.

One or more than one of the mentioned o-dinitrile compounds can be used.

The metallic materials which form nucleus of phthalocyanine type pigments used in the method of this invention are for example; copper and copper compounds such as copper powder, cuprous oxide, cupric oxide, cuprous chloride, cupric chloride, cuprous bromide, cupric bromide, copper sulfate, copper nitrate, copper phosphide, copper hydroxide, copper acetate and the like, zinc and zinc compounds such as zinc powder, zinc oxide, zinc chloride, zinc bromide, zinc sulfate, zinc nitrate, zinc carbonate, zinc acetate and the like, tin and tin compounds such as tin powder, tin oxide, tin chloride, tin bromide, tin sulfate, tin nitrate and the like, lead and lead compounds such as lead powder, lead oxide, lead chloride, lead bromide, lead sulfate, lead nitrate, lead acetate and the like, vanadium and vanadium compounds such as vanadium powder, vanadium oxide, vanadium chloride, vanadium bromide, vanadium sulfate and the like, chromium and chromium compounds such as chromium powder, chromium oxide, chromium chloride, chromium sulfate and the like, molybdenum and molybdenum compounds such as molybdenum powder, molybdenum oxide, molybdenum chloride, molybdenum bromide, and the like, manganese and manganese compounds such as manganese powder, manganese oxide, manganese chloride, manganese bromide, manganese sulfate, manganese nitrate, manganese phosphate and the like, iron and iron compounds such as iron powder, ferrous chloride, ferric chloride, ferrous bromide, ferric bromide, ferrous phosphate, ferric phosphate, ferrous sulfate, ferric sulfate, ferrous nitrate, ferric nitrate and the like, cobalt and cobalt compounds such as cobalt powder, cobalt oxide, cobalt chloride, cobalt bromide, cobalt nitrate and the like, nickel and nickel compounds such as nickel powder, nickel oxide, nickel chloride, nickel bromide, nickel nitrate, nickel sulfate, nickel phosphate, nickel acetate and the like, palladium and palladium compounds such as palladium powder, palladium oxide, palladium chloride, palladium bromide, palladium sulfate, palladium nitrate and the like and platinum compounds such as platinum powder, platinum oxide, platinum chloride, platinum bromide.

The quantity of the metallic materials to be used in the present method is preferably in the range of one or more moles per moles of an o-dinitrile type compound stoichiometrically. It is possible to add at this time hydrosulfites, sodium hydrogen sulfite or the like, as an assistant, to clarify further color tone.

Further, in the method of this invention, as alkaline materials which are selected from the group of hydroxides, oxides, peroxides or carbonates of alkali metal and alkaline earth metal, for example; lithium compounds such as lithium oxide, lithium peroxide, lithium hydroxide, lithium carbonate and the like, sodium compounds such as sodium oxide, sodium peroxide, sodium hydroxide, sodium carbonate and the like, potassium compounds such as potassium oxide, potassium peroxide, potassium hydroxide, potassium carbonate and the like, beryllium compounds such as beryllium oxide, beryllium hydroxide, and the like, magnesium compounds such as magnesium oxide, magnesium hydroxide, and the like, calcium compounds such as calcium oxide, calcium peroxide, calcium hydroxide, and the like, strontium compounds such as strontium oxide, strontium peroxide, strontium peroxide and the like and barium compounds such as barium oxide, barium peroxide, barium hydroxide, and the like can be used.

The above-mentioned alkaline material is added to keep the reaction system in alkaline state and to advance the reaction smoothly. One or more than one of these compounds can be used. The alkaline substance may be employed in amounts of 0.1–2 moles per mole of the o-dinitrile type compound.

More particularly, the amount of alkaline substance to be used differs depending upon the valence of the metal of metallic substance capable of forming a central nucleus of phthalocyanine type pigment and the valence of the metal of alkaline substance.

It varies according to whether the valences of the metal or metallic substance and the alkaline substance are same or not. For instance, whether the valency of the metal of metallic substance is divalent or trivalent relative to monovalent alkaline substance and whether the valency of the metal of metallic substance is monovalent or trivalent relative to divalent alkaline substance. More specifically, cases where NaOH is used will be picked up as examples. When the metal of the metallic substance is monovalent, it is preferable to use 0.25–0.5 mols of NaOH per mol of o-dinitrile type compound, when the metal of the metallic substance is divalent, it is preferable to use 0.5–0.75 mols of NaOH and when the metal of the metallic substance is trivalent, it is preferable to correspondingly increase the amount of NaOH relative to o-dinitrile type compound.

In the method of this invention, it is also possible to add to the above-mentioned alkaline material one or more amines such as urea, biuret, methyl amine, ethyl amine, propyl amine, diethyl amine, triethyl amine, n-propyl amine, di-n-propylamine, tri-n-propyl amine, n-butyl amine, n-amyl amine, n-hexyl amine, ethanol amine, diethanol amine, triethanol amine, ethylene-diamine, trimethylenediamine, tetramethylenediamine, pentamethylenediamine, hexamethylenediamine, pyridine, aniline or the like.

When one of these amines is added, products of superior dispersibility or clear color tone can be obtained.

Some examples of the compounds to be used in the present invention, which can form a complex compound by the combination with a metal capable of forming a central nucleus of phthalocyanine type pigment, are aminopolycarboxylic acids such as ethylene diamine tetraacetic acid, nitrilotriacetic acid, glycolether-diamine tetraacetic acid or the like; O,O'-dihydroxyazo compounds such as 1 - (1 - hydroxy - 2 - naphthylazo) - 6 - nitro- 2 - naphthol - 4 - sulfonic acid, 1 - (2 - hydroxy - 1-naphthyl azo) - 2 - naphthol - 4 - sulfonic acid, 1-(1-hydroxy - 2 - naphthylazo) - 2 - naphthol - 4 - sulfonic acid; O-hydroxyazo compounds such as 1-pyridylazo-2-naphthol, 7 - (1 - naphthylazo) - 8 - quinolinol-5-sulfonic acid, 4 - (4 - nitrophenylazo) - 2 - [N,N'-di(carboxymethyl)-aminomethyl] - 1 - naphthol; phthalein, sulfophthalein and triphenylmethane type compounds such as 3,3' - bis - [N,N' - di(carboxymethyl)-amino]-O-cresolphthalein, fluorescein bismethyliminodiacetic acid, pyrogallolsulfophthalein, 3" - sulfo - 2", 6" - dichloro - 3,3'-dimethyl - 4 - hydroxyfuchsone - 5,5' - dicarboxylic acid; phenol type compounds such as pyrogallol carboxylic acid, salicylic acid or the like; ammonium purpurate, arizalin-3-sulfonic acid, thiourea, diphenylthiocarbazone, dimethylglyoxime, hematoxylin or the like. One or more mixtures of these compounds can be used. Although the amount of the compound to be used differs to some extent according to the kinds of the compounds used or the starting raw materials, it is in the range of 0.1 to 10.0% by weight, perferably 0.2 to 5.0% by weight, based upon the weight of the O-dinitrile type compound.

It is believed that since these compounds combine with a metal capable of forming a central nucleus of phthalocyanine pigment to form a complex compound soluble in a hydrophilic, organic solvent and are rich in reactivity, the synthetic reaction of the phthalocyanine type pigment proceeds smoothly and the phthalocyanine pigment can be obtained under milder conditions and in a higher yield.

Some examples of the hydrophilic organic solvents including hydroxy group which can be used in the present method include monohydric or polyhydric hydrophilic alcohols such as methanol, ethanol, propanol, isopropanol, n-butanol, isobutanol secondary butanol, t-butanol, ethylene glycol, propyleneglycol, polyethylene glycol, polypropyleneglycol, or the like, hydrophilic cellosolves such as methyl cellosolve, ethyl cellosolve, diethylene glycol ethyl ether, or the like and hydrophilic phenols such as phenol, o-, m-, p-cresol or the like can be used. These solvents can be used alone or as solvent mixture.

Any quantity of these solvents can be used so long as the quantity advances the reaction smoothly. Usually 0.5–15 times the quantity of o-dinitrile type compound is used.

In the method of the present invention, it is possible to use a mixture of the above-mentioned hydrophilic organic solvent having a hydroxy radical and another hydrophilic organic solvent, such as hydrophilic amide type solvent such as dimethyl formamide, formamide, dimethyl acetamide, dimethyl sulfoamide, and the like; and halogenated fatty hydrocarbon such as chloroform, methylene chloride, carbon, and the like.

In the present invention, since a compound capable of forming a highly reactive complex compound by the combination with a metal capable of forming a central nucleus of phthalocyanine type pigment is used, the reaction system becomes active and the synthetic reaction of the phthalocyanine type pigment proceeds under relatively mild conditions. Accordingly, the object of the present invention can be fully attained even at a relatively low heating temperature.

In the present invention, although heating temperature differs to some extent depending upon the starting raw materials, the reaction time, and the like, a temperature below 70° C., is preferred. More particularly a better result can be expected in the resultant product at a heating temperature of about 50° C. The phthalocyanine type pigment can be formed even at room temperature, although the reaction time becomes somewhat longer in such a case. The reaction time is usually in the range of 1 to 8 hours, and preferably 3 to 5 hours. The present invention is also advantageous since the yield of the phthalocyanine type pigment can be as much as about 85 to 95%.

In the method of the present invention the phthalocyanine type pigment is formed by a low temperature reaction, as above-mentioned, and a pigment having a clear hue and a large coloring power can be obtained by filtration, water-washing and drying carried out immediately after the completion of the reaction. However if necessary, an additional treatment with a dilute acid or a dilute alkali aqueous solution prior to the filtration and drying, can be employed so that the phthalocyanine type pigment thus obtained has a clearer hue without pulverization and pigmentation as is necessary in the conventional methods. It also has a larger coloring power compared with those obtained according to the conventional methods. Further it possesses various properties which have usually been required for the phthalocyanine type pigments and which are not inferior to conventional products.

When using the phthalocyanine type pigment prepared according to the present invention, it is not necessary to employ large mechanical energy and a long kneading time as in the products obtained according to conventional methods, because the particles are very soft, and easily dispersible in a vehicle. Also the dispersibility is good. Thus, the pigment of the present invention can be used in a wide variety of applications, and gives excellent colored products.

Further, the inventors of the present invention have found that the presence of an organic or inorganic ammonium salt in addition to an alkaline substance and a compound which can form a complex compound by the combination with the metal of a metallic substance capable of forming a central nucleus of phthalocyanine type pigment, gives a metal phthalocyanine type pigment of clear hue, fine crystal state, high coloring power and soft texture under the same production condition with the above-mentioned method.

The above-mentioned inorganic and organic ammonium salts include inorganic ammonium salts such as ammonium chloride, ammonium nitrate, ammonium sulfate, ammonium persulfate, ammonium orthophosphate, ammonium metaphosphate, ammonium pyrophosphate, ammonium carbonate, ammonium bicarbonate or the like, and organic ammonium such as ammonium formate, ammonium acetate, ammonium propionate, ammonium citrate, ammonium oxalate or the like.

One or more kinds of these ammonium salts can be used Although more or less different depending upon the kinds and combination of raw materials, these compounds are used in amounts in the range of 0.1–10% by weight, preferably 0.5–6% by weight, of the o-nitrile compounds.

As above-mentioned the present method relies on a low temperature reaction of o-dinitrile type compound and a metallic substance capable of forming a central nucleus of a phthalocyanine type pigment in a hydrophilic, organic solvent, in the coexistence of an alkaline substance, and which can form a complex compound by the combination with the metal of the metallic substance capable of forming a central nucleus of phthalocyanine type pigment, and an organic or inorganic ammonium salt for producing a metal phthalocyanine type pigment. After the completion of the reaction, it is possible to obtain a pigment having clear hue and large coloring power even by immediate filtration, water washing and drying.

It is also possible to further treat it with a dilute aqueous acid or a dilute aqueous alkali prior to the filtration and drying, if necessary.

The phthalocyanine type pigments thus prepared have a particularly clear hue without the necessity of pulverization and pigmentation as in the conventional methods. Also the pigments of the present invention have large coloring power as compared with those obtained according to the publicly known methods. Various other properties of the phthalocyanine type pigments of the present invention which are required for such pigments are not inferior to the phthalocyanine type pigments obtained from prior art methods.

Since the pigments of the present invention are very soft and possess excellent dispersibility, they can be easily dispersed in a vehicle without the necessity of a large amount of mechanical energy or without the need of a long kneading time such as required for the products obtained by conventional prior art methods. Accordingly, they are available for a wide variety of applications, and give superior colored products.

Further, in the above-mentioned method, it has been also found by the present inventors that when an o-dinitrile type compound and a metallic substance capable of forming a central nucleus of a phthalocyanine type pigment are subjected to a condensation reaction at a low temperature, in the coexistence of an alkaline substance, and the above-mentioned compound which can form a complex compound by the combination with the metal of a metallic substance capable of forming a central nucleus of phthalocyanine type pigment, and in a solvent mixture of a hydrophilic, organic solvent having hydroxyl group and an aromatic system organic solvent, in place of the hydrophilic, organic solvent alone, metallic phthalocyanine type pigments having crystalline structures of α-type (stable type) and β-type (unstable type) and having a clear hue and a large coloring power, can be easily prepared directly without necessity of customary pigmentation treatment. In such case, it has been also observed that either or both of the α-type and β-type can be arbitrarily prepared by varying the mixing ratio of the hydrophilic, organic solvent to the aromatic system organic solvent.

In the above-mentioned method of the present invention, it is possible to use, as hydrophobic, aromatic type organic solvents, aromatic hydrocarbons such as benzene, toluene, xylene, naphthalene, biphenyl or the like, chlorinated aromatic hydrocarbons such as monochlorobenzene, dichlorobenzenes, trichlorobenzenes and chloronaphthalenes or the like, or nitrated aromatic hydrocarbons such as nitrobenzene, chloronitrobenzene, nitrotoluene or the like.

As for the amount of the solvent mixture of the hydrophilic, organic solvent and the above-mentioned hydrophobic, aromatic system organic solvent to be used in the above-mentioned method of the present invention, any amount will be alright so long as it advances the reaction smoothly, but it is usually in the range of 0.5 to 15 times the amount by weight of phthalodinitrile.

In the present invention, the crystalline forms of the metallic phthalocyanine type pigments are different according to the ratio of the aromatic type organic solvent to the hydrophilic solvent. In such case, although the ratio of the aromatic type organic solvent to be used, also varies to some extent according to the kinds of solvents, usually an unstable type can be obtained in case where the aromatic system solvent is mixed by 1 to 40% by weight based upon the total solvent; a mixture of an unstable type and a stable type can be obtained in case where the aromatic type solvent is mixed by 40 to 60% by weight; and a stable type, can be obtained in case where the aromatic type solvent is mixed by above 60% by weight.

In such case, a surfactant may be added in order to improve the affinity of the solvents to be mixed.

As in the above-mentioned method of the present invention, an O-dinitrile type compound is reacted with a metallic substance at a low temperature in the coexistence of an alkaline substance and the above-mentioned compound which can form a complex compound by the combination with the metal of a metallic substance capable of forming a central nucleus of phthalocyanine type pigment in a solvent mixture of the hydrophilic solvent and the aromatic system solvent while varying arbitrarily the mixing ratio of each solvent, to form a metallic phthalocyanine type pigment having a desired crystalline structure of a stable type or unstable type, and a pigment having a clear hue and a large coloring power can be obtained even if it is subjected to filtration, washing and drying immediately after the completion of the reaction.

The above-mentioned method of the present invention does not need pulverization and pigmentation which have been regarded indispensable in the conventional methods to provide a product has various properties generally required for usual, metallic phthalocyanine type pigments. Particularly, the copper phthalocyanine pigment obtained according to the present invention, when it is used for practical coloring, can be, as mentioned above, easily dispersed in a vehicle without necessity of large mechanical energy or a long kneading time as in the products obtained according to the conventional methods, because the particles are very soft, and have excellent dispersibility. Accordingly, it is useful in a wide variety of applications and give superior colored products.

Furthermore, it has been observed by the present inventors in the above-mentioned method of the present invention that when an o-dinitrile system compound and a metallic substance capable of forming a central nucleus of phthalocyanine type pigment are subjected to a condensation reaction, at a low temperature, in the coexistence of an alkaline substance selected from the group consisting of hydroxides, oxides, peroxides and carbonates of alkali metals or alkaline earth metals, and the above-mentioned compound which can form a complex compound by the combination with the metal of a metallic substance capable of forming a central nucleus of phthalocyanine type pigment, and in a hydrophilic, organic solvent having hydroxyl group to form a metallic phthalocyanine type pigment, and immediately thereafter a small amount of an acid is added followed by stirring, without isolation of the formed pigment, the color can be arbitrarily varied from red to yellow by changing the mixing ratio of the acid and the hydrophilic, organic solvent, the kind of the acid, the heating temperature or the stirring time.

As the acids to be added for such post-treatment in the above-mentioned of the present invention, inorganic acids such as hydrochloric acid, nitric acid, sulfuric acid, phosphoric acid, phosphoric anhydride, pyrophosphoricacid or the like, organic acids such as acetic acid, propionic acid, citric acid, oxalic acid or the like, can be used.

In the present invention, since the metallic phthalocyanine is formed at a low temperature in a hydrophilic, organic solvent, the formed particles hardly aggregate and exists merely as primary particles. Further the formation of the acid salt of phthalocyanine by the use of the acid is extremely easy. At the same time, since the removal of impurities such as metals which do not participate in the reaction, or the like, can be extremely easily carried out, a metallic phthalocyanine pigment having a clear hue and also a crystalline form extremely excellent in physical properties, can be obtained.

In the present invention, the above-mentioned acid can be used alone or as a mixture of two or more kinds. Although the amount of the acid to be used, is somewhat varied according to the kind of the hydrophilic, organic solvent, it is usually in the range of 0.5 to 75% by weight, preferably 0.5 to 50% by weight based upon the amount of the hydrophilic, organic solvent.

Such amount corresponds to about 0.015 to 2 times. The amount of formed pigment, and the method of the present invention is said to be commercially advantageous even from the viewpoint that even such a small amount of the acid is sufficient. In addition, even if the amount is more than 75% by weight, the effectiveness does not increase; hence the use of excessive amount more than 75% is not commercially advantageous. Further, particularly when sulfuric acid is used, the crystalline form of the metallic phthalocyanine pigment thus obtained varies according to the concentration (percent by weight of sulfuric acid) in the hydrophilic, organic solvent. Usually, $\beta$-type (unstable type) can be obtained in a concentration of 0.5 to 42% by weight and more than 58% by weight of sulfuric acid in the above-mentioned solvent; $\gamma$-type (unstable type), in a concentration of 43 to 57% by weight thereof; and a mixture of $\beta$-type and $\gamma$-type, in a concentration in the vicinity of 42% or 58% by weight thereof.

Further, the color of the pigment formed according to the above-mentioned method of the present invention, varies somewhat according to the kind of the hydrophilic, organic solvent or the kind of the acid, and also according to the amount of the acid to be used. Namely, if a mineral acid (excluding sulfuric acid) is used, or the amount of acid to be used is large, the color tends to turn red, or white if an organic acid is used. If the amount of acid to be used is small, it tends to turn yellow.

As above-mentioned, the method of the present invention comprises adding an O-dinitrile type compound and a metal or metallic compound capable of forming a central nucleus of a phthalocyanine pigment into a hydrophilic, organic solvent; slowly adding an alkaline substance and a compound which can form a complex compound by the combination with the metal of a metallic substance capable of forming a central nucleus of phthalocyanine type pigment, to the resultant mixture, reacting the mixture at a low temperature (below 70° C.); thereafter adding dropwise and with stirring, an acid to the thus produced phthalocyanine pigment so that the acid and the phthalocyanine blue pigment become homogeneous in the reaction medium; if necessary heating the resultant mixture and then filtering, washing and drying the mixture to obtain a pigment. If necessary it can be further treated with a dilute alkaline aqueous solution after the filtration. In the present invention, acid can be sufficiently removed from the resultant pigment, by means of filtration and water-washing.

In the study of the above-mentioned method of the present invention relating to the production of a metal phthalocyanine pigment by the condensation reaction of an o-dinitrile type compound with a metallic substance capable of forming a central nucleus of phthalocyanine type pigment at a low temperature in the coexistence of an alkaline substance and a compound which can form a complex compound by the combination with the metal of a metallic substance capable of forming a central nucleus of phthalocyanine type pigment, and in a hydrophilic organic solvent, followed by the immediate addition of an acid with stirring, a new fact has been further found that a metal phthalocyanine type pigment composition which is easily dispersible within a short period of time, having a clearer hue and a larger coloring power and capable of coloring various kinds of material, can be prepared by adding a surfactant in the above-mentioned reaction medium, kneading the resultant mixture, and thereafter separating the hydrophilic, organic solvent under the atmospheric or a reduced pressure.

Since according to the above-mentioned method of the present invention, a metal phthalocyanine pigment is formed at a low temperature in a hydrophilic, organic solvent, generally the formed particles exist in the state of being approximately the same original particles without aggregation, and to which a surfactant is deposited or adhered to yield a pigment composition as finely divided particles.

As to the surfactant to be used in accordance with the above-mentioned method of the present invention, various kinds thereof can be used according to the object of the use of the metallic phthalocyanine pigment composition. Representative surfactants include as anionic surfactants, alkylbenzenesulfonates, alkylnaphthalenesulfonates, alkylsulfosuccinates, ligninsulfonates, sulfuric acid esters of fatty alcohols, salts of sulfuric acid ester of castor oil, rosin or the like; as nonionic surfactants, polyoxyethylene fatty acid esters or ethers, polyoxyethylenealkylethers, sorbitan esters, sorbitan monohigher fatty acid salts, polyoxyethylene alkylphenols or ethers, fatty acid alkylamides or the like; and as cationic surfactants, alkyltrimethylammonium chlorides, alkylpyridinium halides, alkylbenzimidazole fatty acid amine salts, cyclohexylamine salts or the like. One or more kinds thereof can be used. Although the amount to be used varies according to their uses, they are used in an amount of 10 to 300% by weight based upon the pigment.

In the present invention, the above-mentioned surfactant may be aded at any time prior to the separation of the hydrophilic, organic solvent, but it is particularly not preferred by the economical reason to add a large amount prior to or during the condensation reaction process of the metal phthalocyanine, because the reaction is hindered and requires a longer time, and hence it is generally preferred that a nonionic or anionic surfactant is added during the time of the condensation reaction of phthalocyanine; a cationic or nonionic surfactant, during the time of the addition process of acid; and a nonionic, cationic or anionic surfactant, prior to the removal of solvent.

Further, publicly known synthetic resins can be also used simultaneously according to the object. A particularly advantageous embodiment of the present invention is a process in which one part of the above-mentioned surfactant is added, prior to or during the condensation reaction process of the metal phthalocyanine; the remaining part, during or after the acid addition process and prior to the separation of the hydrophilic, organic solvent, the resultant mixture is kneaded, a dilute alkali solution is added to neutralize the acid; thereafter the resultant pigment covered by the surfactant is separated by means of filtration, pressing or a low temperature centrifugal separation, and the hydrophilic, organic solvent is eliminated at 30 to 50° C., under the atmospheric or a suitably reduced pressure, to obtain a pigment composition. Further, in the present invention, a dry, powdery pigment composition can be also obtained by a following pulverization in a suitable milling or kneading apparatus.

In the present invention, although the object can be fully attained only by distilling off the hydrophilic, organic solvent, additional filtration and washing are advantageous, because impurities can be easily removed.

The pigment compositions obtained according to the above-mentioned method of the present invention are mixed into a vehicle according to the objective use and in a conventional manner, whereby water-color ink, water paint, emulsion paint, oil ink, oil paint can be prepared.

Further, they can be also used in a conventional manner, for synthetic and natural rubber emulsions, pigment printing, coloring agent for spinning dope of synthetic fibers, papers, coloring materials, coloring agent in aqueous vehicle for urethane foam or the like, or oil coloring agent for synthetic resins rubbers or the like.

It has been also observed by the present inventors that if an o-dinitrile type compound is reacted with a metallic substance capable of forming a central nucleus of phthalocyanine type pigment, at a low temperature, in the coexistence of an alkaline substance and a compound which can form a complex compound by the combination with the metal of a metallic substance capable of forming a central nucleus of phthalocyanine type pigment, and in a hydrophilic, organic solvent, to form a metal phthalocyanine type pigment, thereafter sulfuric acid is directly added without isolation of reaction product followed by stirring to form a sulfate, and then free sulfuric acid is removed by means of water or an organic solvent, then a sulfate of metal phthalocyanine type pigment can be obtained with almost no decomposition of the sulfate and in a high yield, and further such sulfate thus obtained is very stable.

In the above-mentioned method, since the metal phthalocyanine type pigment is formed at a low temperature and in a hydrophilic organic solvent, the formed particles are existent in a state of nearly primary particles, with almost no aggregation, and the formation of the sulfate of metal phthalocyanine pigment by the use of sulfuric acid, can be very easily carried out. At the same time, since impurities such as metals which do not participate in the reaction, can be removed almost completely, the sulfate can be obtained in an extremely high purity.

Although the amount of sulfuric acid to be used for obtaining the sulfate of phthalocyanine type pigment, varies to some extent according to the kinds of the starting material or the hydrophilic organic solvent, the sulfate of copper phthalocyanine type pigment can be obtained usually when sulfuric acid is used in a proportion of 43 to 57% by weight to the organic solvent. A proportion below 43% by weight or above 58% by weight is not preferred, because a sulfate which is stable to water cannot be obtained.

As mentioned above, in the method of the present invention, an O-dinitrile type compound and a metal or a metallic compound capable of forming a central nucleus of phthalocyanine type pigment are added into a hydrophilic, organic solvent, and further an alkaline substance and a compound which can form a complex compound by the combination with a metal capable of forming a central nucleus of phthalocyanine type pigment, are slowly added to the resultant mixture, and then they are reacted at a low temperature (below 70° C.); thereafter sulfuric acid is added dropwise into the reaction medium with stirring so as to uniformly distribute the acid; if necessary, they are heated with stirring; and a sulfate can be obtained by the following filtration, water-washing or washing with an optional organic solvent and drying.

In the present embodiment since the formed sulfate of metal phthalocyanine pigment is stable to water, a very pure sulfate can be obtained only by water-washing. It can also be washed with a conventional, organic solvent such as alcohol, Cellosolve, cresol or the like.

The sulfate of metal phthalocyanine type pigment thus formed is in the state of primary particles in an organic solvent wherein the sulfate of metal phthalocyanine type pigment is combined with sulfuric acid, hence it has no such a drawback as in the sulfates obtained in the conventional method. In the conventional method, sulfuric acid attaches to the crystalline surface of the sulfate, absorbs water to cause the hydrolysis of the sulfate, resulting in the formation of original metal phthalocyanine type pigment. Further, it is quite stable to water, can be stored for a long time, and is convenient in handling. Furthermore, when the sulfate of the present invention is hydrolyzed by an alkali with stirring at room temperature for a long time or heating, a metal phthalocyanine pigment containing almost no free metal can be obtained. Such pigment has a clear hue, its particles are very soft and exceedingly dispersible, and hence it can be used in wide variety of coloring applications.

The present invention may be more fully understood from the following examples offered by way of illustration. All parts in the examples are by weight.

EXAMPLE 1

To 120 parts of methanol were added with stirring 32 parts of phthalodinitrile, 6.2 parts of cuprous chloride, 3.0 parts of sodium hydroxide, and 0.5 part of dimethyl glyoxime. The reaction was carried out by stirring the mixture at a temperature in the range of 25 to 30° C. for one hour and then under reflux for one hour. After filtration, the resulting product was washed with methanol and then with water, and dried to obtain 33.5 parts of blue-colored copper-phthalocyanine pigment.

EXAMPLE 2

To 150 parts of ethanol were added with stirring 32 parts of phthalodinitrile, 6.2 parts of cuprous chloride, 4.5 parts of potassium hydroxide, and 1.0 part of ethylene diamine tetraacetate. The reaction was carried out by stirring the mixture at a temperature in the range of 25 to 30° C. for half an hour and then at a temperature in the range of 60 to 65° C. for 4 hours. After filtration, the resulting product was washed with methanol and then with water, and dried to obtain 32.1 parts of blue-colored copper phthalocyanine pigment.

EXAMPLE 3

To 150 parts of butanol were added with stirring 32 parts of phthalodinitrile, 10.0 parts of copper sulfate, 5.8 parts of sodium peroxide, and 2.0 parts of 1-pyridylazo-2-naphthol. The reaction was carried out by stirring the mixture at a temperature in the range of 25 to 30° C. for one hour and then at 50° C. for 3 hours. After filtration, the resulting product was washed with methanol and then with water, and dried to obtain 31.5 parts of blue-colored copper phthalocyanine pigment.

EXAMPLE 4

To 180 parts of polyethylene glycol were added with stirring 32 parts of phthalodinitrile, 4.9 parts of nickel oxide, 2.0 parts of urea, 4.0 parts of sodium hydroxide, and 4.9 parts of 1,2-cyclohexanonediamine-tetraacetate. The reaction was carried out by stirring the mixture at a temperature in the range of 25 to 30° C. for one hour and in the range of 60 to 65° C. for 3 hours. After filtration, the resulting product was washed with methanol and then with water, and dried to obtain 31.2 parts of blue-colored nickel phthalocyanine pigment.

EXAMPLE 5

To 180 parts of methanol were added with stirring 32 parts of phthalodinitrile, 18.2 parts of nickel nitrate, 2.5 parts of triethylamine, 7.0 parts of calcium hydroxide, and 2.0 parts of 3,3'-bis [N,N-di(carboxymethyl)aminomethyl]-cresol-sulfophthalein. The reaction was carried out by stirring the mixture at a temperature in the range of 25 to 30° C. for one hour and then in the range of 50 to 60° C. for 3 hours. After filtration, the resulting product was washed with methanol and then with water, and dried to obtain 30.9 parts of blue-colored nickel phthalocyanine pigment.

EXAMPLE 6

To 180 parts of ethanol were added with stirring 32 parts of phthalodinitrile, 18.2 parts of cobalt nitrate, 2.5 parts of ethanolamine, 5.2 parts of calcium hydroxide, and 0.5 part of ammonium purpurate. The reaction was carried out by stirring the mixture at a temperature in the range of 25 to 30° C. for one hour and then in the range of 50 to 60° C. for 3 hours. After filtration, the resulting product was washed with methanol and then with water, and dried to obtain 32.1 parts of blue-colored cobalt phthalocyanine pigment.

EXAMPLE 7

To 180 parts of O-cresol were added with stirring 32 parts of phthalodinitrile, 12.6 parts of molybdenum chloride, 8.5 parts of sodium hydroxide, 0.5 part of sodium peroxide, and 1.0 part of dimethyl glyoxime. The reaction was carried out by stirring the mixture at a temperature in the range of 25 to 30° C. for half an hour and then in the range of 65 to 70° C. for 5 hours. After filtration, the resulting product was washed with methanol and then with water, and dried to obtain 26.5 parts of blue-colored molybdenum phthalocyanine pigment.

EXAMPLE 8

To a mixture of 100 parts of methanol and 50 parts of phenol were added with stirring 16 parts of phthalodinitrile, 20.3 parts of mono-chloro-phthalodinitrile, 4.2 parts of copper powder, 2.8 parts of soidum peroxide, and 1.5 parts of oxime. The reaction was carried out by stirring the mixture at a temperature in the range of 25 to 30° C. for one hour and then at temperature in the range of 60 65° C. for 2 hours. After filtration, the resulting product was washed with methanol and then with water, and dried to obtain 36.8 parts of blue-colored copper dichlorophthalocyanine pigment.

EXAMPLE 9

To 150 parts of ethanol were added with stirring 16 parts of phthalodinitrile, 33.2 parts of tetrachloro-phthalodinitrile, 8.4 parts of cupric chloride, 8.0 parts of potassium hydroxide, and 2.0 parts of diphenylcarbazone. The reaction was carried out by stirring the mixture at a temperature in the range of 25 to 30° C. for one hour and then under reflux for 1 hour. After filtration, the resulting product was washed with methanol and then with water, and dried to obtain 34.5 parts of bluish green-colored copper-chloro-phthalocyanine pigment.

EXAMPLE 10

To 100 parts of ethylene glycol were added with stirring 16 parts of phthalodinitrile, 35.7 parts of dibromophthalodinitrile, 6.2 parts of cuprous chloride, 5.0 parts of sodium hydroxide, 1.0 part of sodium carbonate, and 0.5 part of nitrilotriacetate. The reaction was carried out by stirring the mixture at a temperature in the range of 25 to 30° C. for one hour and then in the range of 70 to 75° C. for 3 hours. After filtration, the resulting product was washed with methanol and then with water, and dried to obtain 40.2 parts of bluish green-colored copper tetrabromophthalocyanine pigment.

EXAMPLE 11

To a mixture of 100 parts of ethanol and 50 parts of phenol were added with stirring 16 parts of phthalodinitrile, 31.8 parts of monoiodophthalodinitrile, 6.8 parts of cuprous chloride, 2.0 parts of diethylamine, 5.0 parts of potassium hydroxide, and 0.8 part of diphenyl-thiocarbazone. The reaction was carried out by stirring the mixture at a temperature in the range of 25 to 30° C. for one hour and then in the range of 65 to 70° C. for 4 hours. After filtration, the resulting product was washed with methanol and then with water, and dried to obtain 42.2 parts of bluish green-colored copper diiodophthalocyanine pigment.

EXAMPLE 12

To a mixture of 150 of methanol and 100 parts of phenol were added with stirring 40.3 parts of monochlorophthalodinitrile, 15.1 parts of copper nitrate, 2.8 parts of sodium hydroxide and 1.0 part of oxime. The reaction was carried out by stirring the mixture at a temperature in the range of 25 ot 30° C. for one hour and then in the range of 60 to 65° C. for 5 hours. After filtration, the resulting product was washed with methanol and then with water, and dried to obtain 35.5 parts of blue-colored tetrachlorophthalocyanine pigment.

EXAMPLE 13

To 250 parts of ethanol were added with stirring 66.5 parts of tetrachlorophthalodinitrile, 8.4 parts of cupric chloride, 1.0 part of cupric chloride, 1.0 part of aniline, 5.5 parts of sodium hydroxide, and 0.8 part of thiourea. The reaction was carried out by stirring the mixture at a temperature in the range of 25 to 30° C. for half an hour and then under reflux for 3 hours. After filtration, the resulting product was washed with methanol and then with water, and dried to obtain 56.4 parts of green-colored copper hexadeca-chlorophthalocyanine pigment.

EXAMPLE 14

To a mixture of 260 parts of propanol and 100 parts of phenol were added with stirring 71.5 parts of dibromophthalodinitrile, 8.4 parts of cupric chloride, 5.5 parts of sodium hydroxide, and 1.0 part of thiourea. The reaction was carried out by stirring the mixture at a temperature in the range of 25 to 30° C. for one hour and then in the range of 65 to 70° C. for 4 hours. After filtration, the resulting product was washed with methanol and then with water, and dried to obtain 56.6 parts of green-colored copper octabromophthalocyanine pigment.

EXAMPLE 15

To a mixture of 100 parts of phenol and 300 parts of methanol were added 63.5 parts of monoiodophthalodinitrile, 6.8 parts of cuprous chloride, 3.6 parts of potassium hydroxide, and 1.0 part of diethylenetriamine pentaacetate. The reaction was carried out by stirring the mixture at a temperature in the range of 25 to 30° C. for one hour and at a temperature in the range of 60 to 65° C. for 3 hours. After filtration, the resulting product was washed with methanol and then with water and dried to obtain 50.6 parts of the green-colored copper tetraiodophthalocyanine pigment.

EXAMPLE 16

To 30 parts of methanol were added 32 parts of phthalodinitrile, 6.2 parts of cuprous chloride, 0.5 part of sodium hydroxide, and 0.5 part of dithizone. The reaction was carried out by stirring the mixture by a kneader at room temperature for 2 hours and then under reflux of methanol for 2 hours.

After filtration, the resulting product was poured into a large amount of methanol, and the mixture was stirred well, filtered, washed with methanol and then with water several times to obtain 32.1 parts of copper phthalocyanine pigment.

EXAMPLE 17

To 50 parts of ethyleneglycol were added 32 parts of phthalodinitrile, 8.4 parts of cupric chloride, 6.2 parts of sodium hydroxide, 0.5 part of dimethylglyoxime, and 1.7 parts of ammonium chloride. The reaction was carried out by stirring the mixture by a kneader at room temperature for 10 hours.

After filtration, a large amount of methanol was poured into the resulting product, and the mixture was stirred well, filtered, washed with methanol and then with water several times to obtain 32.0 parts of copper phthalocyanine pigment.

EXAMPLE 18

To 150 parts of phenol were added 32 parts of phthalodinitrile, 10.9 parts of copper sulfate, 8.0 parts of potassium hydroxide, 0.5 part of oxime, and 2.5 parts of ethanolamine. The reaction was carried out by stirring the mixture at room temperature for 3 hours and then at a temperature in the range of 60 to 65° C. for 3 hours.

The mixture was then filtered. The solid was washed with water, and treated with 720 parts each of a 1% aqueous hydrochloric acid solution and a 1% aqueous sodium hydroxide solution, both at 95° C. for 30 minutes. The product was washed with water and dried to obtain 32.1 parts of copper phthalocyanine pigment. The pigment has the well known type crystal form which shows peaks at the X-ray diffraction angles of 20±0.2° (CuK$_a$/Ni), of 6.9, 9.0, 10.4, 12.4, 18.0, 18.4, 21.2, 23.6, 26.0, 27.9, and 30.3.

EXAMPLE 19

To a solvent mixture of 60 parts of phenol and 60 parts of 0-xylol were added 32 parts of phthalodinitrile, 8.4 parts of cupric chloride, 10.0 parts of sodium hydroxide, and 1.0 part of dithizone. The reaction was carried out by stirring the mixture at room temperature for 5 hours and then at a temperature in the range of 60 to 65° C. for 3 hours. After filtration, the resulting product was washed with methanol and then with water, and dried to obtain 30.5 parts of the copper phthalocyanine pigment. The pigment shows the similar X-ray diffraction pattern as found in Example 18.

EXAMPLES 20–47

Following the procedure of the foregoing examples, but using those materials described in the following table, the corresponding phthalocyanine pigments may be obtained.

| Example | 20 | 21 | 22 | 23 |
|---|---|---|---|---|
| o-Dinitrile compounds | Phthalodinitrile | Phthalodinitrile | Phthalodinitrile | Phthalodinitrile. |
| Parts | 32 | 32 | 32 | 32. |
| Metallic substances | Cobalt chloride | Nickel chloride | Copper powder | Zinc chloride. |
| Parts | 8.2 | 8.2 | 4.0 | 8.5. |
| Alkaline substances | Sodium hydroxide | Sodium hydroxide | Sodium peroxide | Potassium hydroxide. |
| Parts | 5.7 | 5.7 | 3.4 | 4.2. |
| Complex-making compounds | Dithizone | Dimethyl glyoxime | Thiourea | Ethylenediamine tetraacetate. |
| Parts | 0.5 | 0.5 | 1.0 | 1.0. |
| Hydrophilic organic solvents | Methanol | Ethanol | Isopropanol | Ethylene glycol. |
| Parts | 120 | 120 | 130 | 150. |
| Yield (parts) | 30.5 | 30.7 | 33.0 | 29.0. |

| Example | 24 | 25 | 26 | 27 |
|---|---|---|---|---|
| o-Dinitrile compounds | Phthalodinitrile | Phthalodinitrile | Phthalodinitrile | Phthalodinitrile. |
| Parts | 32 | 32 | 32 | 32. |
| Metallic substances | Stanous chloride | Lead sulfate | Vanadium chloride | Chromous chloride. |
| Parts | 11.9 | 19.0 | 7.6 | 7.7. |
| Alkaline substances | Sodium oxide | Sodium peroxide | Sodium peroxide | Sodium peroxide. |
| Parts | 3.0 | 3.4 | 3.4 | 3.4. |
| Complex-making compounds | Dithizone | Dithizone | Dithizone | Diphenylcarbazone. |
| Parts | 0.5 | 0.5 | 0.5 | 2.0. |
| Hydrophilic organic solvents | Methyl Cellosolve | Methanol | Metahnol | Methanol. |
| Parts | 100 | 120 | 120 | 120. |
| Yield (parts) | 31.5 | 31.1 | 32.0 | 30.1. |

| Example | 28 | 29 | 30 | 31 |
|---|---|---|---|---|
| o-Dinitrile compounds | Phthalodinitrile | Phthalodinitrile | Phthalodinitrile | Phthalodinitrile. |
| Parts | 32 | 32 | 32 | 32. |
| Metallic substances | Managanese chloride | Ferrous sulfate | Palladium chloride | Platinum chloride. |
| Parts | 7.9 | 9.5 | 13.3 | 15.6. |
| Alkaline substances | Sodium peroxide | Potassium hydroxide | Sodium hydroxide | Potassium peroxide. |
| Parts | 3.6 | 4.2 | 3.4 | 4.2. |
| Complex-making compounds | Nitrilo triacetate | Oxime | Dithizone | Dithizone. |
| Parts | 0.5 | 0.5 | 0.5 | 0.5. |
| Hydrophilic organic solvents | Methanol | Phenol | O-cresol | Butanol. |
| Parts | 120 | 130 | 130 | 120. |
| Yield (parts) | 30.1 | 32.0 | 29.9 | 28.1. |

| Example | 32 | 33 | 34 | 35 |
|---|---|---|---|---|
| o-Dinitrile compounds | Sulfophthalodinitrile | Nitrophthalodinitrile | Aminophthalodinitrile | Methylphthalodinitrile. |
| Parts | 51.6 | 43.3 | 35.8 | 35.5. |
| Metallic substances | Cuprous chloride | Copper sulfate | Cupric hydroxide | Copper sulfate. |
| Parts | 6.2 | 10.9 | 6.6 | 10.9. |
| Alkaline substances | Lithium hydroxide | Beryllium hydroxide | Magnesium hydroxide | Sodium hydroxide. |
| Parts | 4.2 | 3.4 | 4.2 | 3.4. |
| Complex-making compounds | Dithizone | Thiourea | Dimethyl glyoxime | Oxime. |
| Parts | 0.5 | 1.0 | 0.5 | 0.5. |
| Hydrophilic organic solvents | Methanol | Ethanol | Ethylene glycol | Butanol. |
| Parts | 120 | 120 | 150 | 150. |
| Yield (parts) | 44.8 | 38.0 | 32.2 | 30.2. |

| Example | 36 | 37 | 38 | 39 |
|---|---|---|---|---|
| o-Dinitrile compounds | Ethylphthalodinitrile | Methoxyphthalodinitrile | Ethoxyphthalodinitrile | 1,2-dinitrilenaphthalene. |
| Parts | 39.3 | 39.5 | 43.0 | 44.4. |
| Metallic substances | Cuprous chloride | Cupric chloride | Cupric chloride | Copper sulfate. |
| Parts | 6.2 | 8.4 | 8.4 | 10.9. |
| Alkaline substances | Potassium hydroxide | Sodium hydroxide | Sodium hydroxide | Sodium peroxide. |
| Parts | 4.2 | 5.0 | 5.0 | 3.4. |
| Complex-making compounds | Dimethyl glyoxime | Ethylenediamine tetraacetate | Nitrilotriacetate | Dithizone. |
| Parts | 0.5 | 1.0 | 0.5 | 0.5. |
| Hydrophilic organic solvents | {Methanol / Butanol} | {Methanol} | Ethanol | {Methanol / Naphthalene}. |
| Parts | {50 / 50} | {120} | 120 | {120 / 10}. |
| Yield (parts) | 34.5 | 34.4 | 36.7 | 36.4. |

| Example | 40 | 41 | 42 | 43 |
|---|---|---|---|---|
| o-Dinitrile compounds | 2,3-dinitrile-naphthalene | 2,3-dinitrile-anthracene | 2,3-dinitrile-phenanthlene | Phthalodinitrile. |
| Parts | 44.5 | 57.0 | 57.0 | 32.0. |
| Metallic substances | Copper acetate | Cuprous chloride | Cuprous chloride | Ferric sulfate. |
| Parts | 7.0 | 6.2 | 6.2 | 12.6. |
| Alkaline substances | Sodium carbonate | Sodium hydroxide | Sodium hydroxide | Sodium hydroxide. |
| Parts | 15.0 | 5.0 | 5.0 | 5.7. |
| Complex-making compounds | Dithizone | Thiourea | Dimethyl glyoxime | Oxime. |
| Parts | 0.5 | 0.5 | 0.5 | 0.5. |
| Hydrophilic organic solvents | {Methanol / Naphthalene} | Methanol / Dimethylsulfoamide | Ethanol / Dimethylsulfoamide | {Methanol}. |
| Parts | {120 / 20} | 100 / 50 | 100 / 50 | {120}. |
| Yield (parts) | 35.0 | 45.3 | 45.2 | 31.5. |

TABLE—Continued

| Example | 44 | 45 | 46 | 47 |
|---|---|---|---|---|
| o-Dinitrile compounds | Phthalodinitrile | Methylphthalodinitrile | Methoxyphthalodinitrile | 2,3-dinitrile pyridine. |
| Parts | 32.0 | 35.5 | 39.5 | 32.0. |
| Metallic substances | Cobaltous chloride | Cupric oxide | Copper powder | Copper powder. |
| Parts | 8.2 | 5.0 | 4.0 | 4.0. |
| Alkaline substances | Sodium hydroxide | Sodium hydroxide | Sodium peroxide | Sodium peroxide. |
| Parts | 5.0 | 5.0 | 3.4 | 3.4. |
| Complex-making compounds | Oxime | Dithizone | Dithizone | Dithizone. |
| Parts | 0.5 | 0.5 | 0.5 | 0.5. |
| Hydrophilic organic solvents | Methanol | Methanol | Methanol | Methanol. |
| Parts | 120 | 120 | 120 | 120. |
| Yield (parts) | 30.5 | 32.0 | 34.6 | 31.0. |

EXAMPLE 48

To 120 parts of methanol were added with stirring 32 parts of phthalodinitrile, 6.2 parts of cuprous chloride, 2.5 parts of ammonium chloride, 2.4 parts of ammonium pyrophosphate, 0.3 part of dimethylglyoxime and 4.8 parts of sodium hydroxide. The reaction was carried out by stirring the mixture at a temperature in the range of 25 to 30° C. for one hour and then under reflux for 3 hours. After filtration, the resulting product was washed with methanol and then with water, and treated with 720 parts each of a 1% aqueous hydrochloric acid solution and a 1% aqueous sodium hydroxide solution, both at 95° C. for one hour. The product was washed with water and dried to obtain 33.5 parts of blue-colored copper phthalocyanine pigment.

EXAMPLE 49

To 100 parts of methanol were added with stirring 32 parts of phthalodinitrile, 8.4 parts of cupric chloride, 2.5 parts of ammonium chloride, 2.0 parts of ammonium pyrophosphate, 6.0 parts of sodium hydroxide, 2.0 parts of sodium carbonate, and 0.5 part of dithizone. The reaction was carried out by stirring the mixture at a temperature in the range of 25 to 30° C. for one hour and then under reflux for 3 hours. After filtration, the resulting product was washed with methanol and then with water, and was treated with 720 parts each of a 1% aqueous hydrochloric acid solution and a 1% sodium hydroxide solution, both at 95° C. for one hour. The product was washed with water and dried to obtain 32.0 parts of blue-colored copper phthalocyanine pigment.

EXAMPLE 50

To 180 parts of methanol were added with stirring 43.3 parts of nitrophthalodinitrile, 10.0 parts of copper sulfate, 2.5 parts of ammonium acetate, 8.5 parts of potassium hydroxide, and 0.5 part of dithizone. The reaction was carried out by stirring the mixture at a temperature in the range of 25 to 30° C. for one hour and then in the range of 45 to 50° C. for 8 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 39.4 parts of copper phthalocyanine pigment.

EXAMPLE 51

To 150 parts of ethyl Cellosolve were added with stirring 35 parts of methylphthalodinitrile, 12.5 parts of copper acetate, 3.0 parts of ammonium citrate, 4.6 parts of sodium hydroxide, and 1.0 part of nitrilo triacetate. The reaction was carried out by stirring the mixture at a temperature in the range of 25 to 30° C. for one hour and then in the range of 65 to 70° C. for 4 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 31.0 parts of phthalocyanine pigment.

EXAMPLE 52

To 100 parts of methanol were added with stirring 32 parts of phthalodinitrile, 8.3 parts of nickel chloride, 3.0 parts of ammonium acetate, 7.5 parts of potassium hydroxide, and 1.0 part of dithizone. The reaction was carried out by stirring the mixture at a temperature in the range of 25 to 30° C. for one hour and then under reflux for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 30.5 parts of the blue-colored nickel phthalocyanine pigment.

EXAMPLE 53

To 120 parts of isopropanol were added with stirring 32 parts of phthalodinitrile, 10.4 parts of nickel oxide, 2.0 parts of ammonium metaphosphate, 5.0 parts of sodium peroxide, and 1.0 part of thiourea. The reaction was carried out by stirring the mixture at a temperature in the range of 25 to 30° C. for one hour and then in the range of 65 to 60° C. for 4 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 31.5 parts of blue-colored nickel phthalocyanine pigment.

EXAMPLE 54

To a mixture of 100 parts of ethylene glycol and 50 parts of ethanol were added with stirring 32 parts of phthalodinitrile, 17.6 parts of cobalt sulfate, 3.0 parts of ammonium chloride, 7.6 parts of potassium peroxide and 1.0 part of ethylene diamine tetraacetate. The reaction was carried out by stirring the mixture at a temperature in the range of 25–30° C. for one hour and then in the range of 70 to 75° C. for 2 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 30.1 parts of blue-colored cobalt phthalocyanine pigment.

EXAMPLE 55

To 150 parts of methanol were added with stirring 32 parts of phthalodinitrile, 18.2 parts of cobalt nitrate, 3.0 parts of ammonium sulfate, 2.0 parts of urea, 5.0 parts of sodium hydroxide, and 0.5 part of dimethyl glyoxime. The reaction was carried out by stirring the mixture at a temperature in the range of 25 to 30° C. for one hour and then at 75° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 30.5 parts of blue-colored cobalt phthalocyanine pigment.

EXAMPLE 56

To 120 parts of propanol were added with stirring 32 parts of phthalodinitrile, 12.7 parts of molybdenum chloride powder, 3.0 parts of ammonium nitrate, 5.0 parts of triethylamine, 5.0 parts of sodium carbonate, and 0.5 part of dithizone. The reaction was carried out by stirring the mixture at a temperature in the range of 25 to 30° C.

for one hour and in the range of 60 to 65° C. for 4 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 30.6 parts of blue-colored molybdenum phthalocyanine pigment.

EXAMPLE 57

To 150 parts of polyethylene glycol were added with stirring 32 parts of phthalodinitrile, 18.0 parts of zinc sulfate, 3.0 parts of ammonium sulfate and 5.0 parts of sodium peroxide. The reaction was carried out by stirring the mixture at a temperature in the range of 25 to 30° C. for one hour and then in the range of 65 to 70° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 29.8 parts of bluish green-colored zinc phthalocyanine pigment.

EXAMPLE 58

To a mixture of 50 parts of benzene and 120 parts of methanol were added with stirring 16 parts of phthalodinitrile, 20.3 parts of monochloro phthalodinitrile, 2.0 parts of copper powder, 3.1 parts of cuprous chloride, 2.5 parts of ammonium chloride, 5.0 parts of sodium peroxide, 0.5 part of dithizone, and 2.0 parts of ethylene diamine. The reaction was carried out by stirring the mixture at a temperature in the range of 25 to 30° C. for one hour and then in the range of 65 to 70° C. for 4 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 32.5 parts of blue-colored copper chlorophthalocyanine pigment.

EXAMPLE 59

To a mixture of 30 parts of phenol and 120 parts of methanol were added with stirring 16 parts of phthalodinitrile, 33.2 parts of tetrachlorophthalodinitrile, 8.4 parts of cupric chloride, 0.5 part of ammonium acetate, 2.0 parts of pyridine, 15.5 parts of sodium peroxide, and 0.3 part of dimethyl glyoxime. The reaction was carried out by stirring the mixture at a temperature in the range of 25 to 30° C. for one hour and then in the range of 65 to 70° C. for 2 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 42.0 parts of bluish green-colored copper chloro phthalocyanine pigment.

EXAMPLE 60

To a mixture of 50 parts of phenol and 100 parts of ethanol were added with stirring 16 parts of phthalodinitrile, 35.7 parts of dibromophthalodinitrile, 6.2 parts of cuprous chloride, 3.0 parts of ammonium nitrate, 8.5 parts of potassium hydroxide, and 1.0 part of dithizone. The reaction was carried out by stirring the mixture at a temperature in the range of 25 to 30° C. for one hour and then in the range of 70 to 75° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 43.5 parts of bluish green-colored copper tetrabromophthalocyanine pigment.

EXAMPLE 61

To a mixture of 50 parts of methanol and 100 parts of ethylene diamine were added with stirring 16 parts of phthalodinitrile, 31.8 parts of monoiodophthalodinitrile, 10.9 parts of copper sulfate, 2.5 parts of ammonium chloride, 7.0 parts of sodium hydroxide, and 1.5 parts of pyrogallol sulfo phthalein. The reaction was carried out by stirring the mixture at a temperature in the range of 25 to 30° C. for one hour and then in the range of 70 to 75° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 40.5 parts of bluish green-colored copper diiodophthalocyanine pigment.

EXAMPLE 62(a)

To 180 parts of phenol were added with stirring 16 parts of phthalodinitrile, 24.6 parts of dichlorophthalodinitrile, 15.1 parts of cupric chloride, 2.5 parts of ammonium chloride, 7.0 parts of sodium hydroxide, and 1.0 part of dithizone. The reaction was carried out by stirring the mixture at a temperature in the range of 50 to 60° C. for one hour and then in the range of 70 to 75° C. for 3 hours. After filtration, the resulting product was washed with methanol and then with water, and was treated with 720 parts each of a 1% aqueous hydrochloric acid solution and a 1% aqueous sodium hyrdoxide solution, both at 95° C. for one hour. The product was washed with water and dried to obtain 37.2 parts of bluish green-colored copper tetrachlorophthalocyanine pigment.

EXAMPLE 62(b)

To a mixture of 50 parts of benzene and 100 parts of phenol were added with stirring 40.6 parts of monochlorophthalodinitrile, 6.8 parts of cuprous chloride, 0.5 part of ammonium acetate, 5.0 parts of diethylamine, 5.0 parts of sodium carbonate, 0.5 part of sodium peroxide, and 0.5 part of nitrilo triacetate. The reaction was carried out by stirring the mixture at a temperature in the range of 25 to 30° C. for one hour and then in the range of 65 to 70° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 35.5 parts of bluish green-colored copper tetrachlorophthalocyanine pigment.

EXAMPLE 63

To a mixture of 150 parts of methanol and 180 parts of ethanol were added with stirring 71.5 parts of dibromophthalo-dinitrile, 10.9 parts of copper sulfate, 2.5 parts of ammonium chloride, 2.0 parts of pyridine, 7.0 parts of potassium peroxide, and 0.5 part of dithizone. The reaction was carried out by stirring the mixture at a temperature in the range of 25 to 30° C. for one hour and then at a temperature in range of 60 to 65° C. for 4 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 59.7 parts of green-colored copper octabromo phthalocyanine pigment.

EXAMPLE 64

To 260 parts of phenol were added with stirring 63.5 parts of monoiodophthalodinitrile, 8.4 parts of cuprous chloride, 3.0 parts of ammonium nitrate, 2.0 parts of aniline, 3.5 parts of sodium peroxide, and 0.5 part of dithizone. The reaction was carried out by stirring the mixture at a temperature in the range of 50 to 60° C. for one hour and then in the range of 70 to 75° C. for 3 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 54.3 parts of green-colored copper tetradiodophthalocyanine pigment.

EXAMPLE 65

To a mixture of 150 parts of phenol and 100 parts of ethanol were added with stirring 66.5 parts of tetrachlorophthalodinitrile, 6.8 parts of cuprous chloride, 4.0 parts of ammonium citrate, 1.0 part of ammonium chloride, 4.8 parts of sodium hydroxide, and 0.3 part of dimethyl glyoxime. The reaction was carried out by stirring the mixture at a temperature in the range of 25 to 30° C. for one hour and then at a temperature in the range of 50 to 55° C. for 6 hours. After filtration, the resulting product was washed with methanol and then with water, and was treated with 720 parts each of a 1% aqueous hydrochloric acid solution and a 1% aqueous sodium hydroxide solution, both at 95° C. for one hour. The product was washed with water and dried to obtain 55.7 parts of green-colored copper hexadecachloro-phthalocyanine pigment.

EXAMPLE 66

To a solvent mixture of 75 parts of methanol and 25 parts of xylol were added with stirring 32 parts of phthalodinitrile, 6.2 parts of cuprous chloride, 3.0 parts of sodium hydroxide, 2 parts of dodecylbenzene sulfonate and 0.5 part of dithizone. The reaction was carried out by stirring the mixture at a temperature in the range of 25 to 30° C. for 5 hours and then under reflux for 1 hour. After filtration, the resulting product was washed with methanol and then with water, and was treated with 720 parts each of a 1% aqueous hydrochloric acid solution and a 1% aqueous sodium hydroxide solution, both at 95° C. for 30 minutes. The product was washed with water and dried to obtain 32.1 parts of the copper phthalocyanine pigment.

The pigment has the well known β-type crystal form which shows peaks at the X-ray diffraction angles of $2\theta(CuK_\alpha/Ni)$, of 6.8, 7.2, 9.9, 15.6, 16.0, 24.0, 24.8, 26.6, and 27.4.

EXAMPLE 67

To a solvent mixture of 150 parts of phenol and 30 parts of nitrobenzene were added with stirring 32 parts of phthalodinitrile, 15.5 parts of copper sulfate, 8.5 parts of potassium hydroxide, 1.0 part of thiourea, and 40 parts of ethylene glycol. The reaction was carried out by stirring the mixture in the range of 30 to 40° C. for 3 hours and then in the range of 70 to 75° C. for 2 hours. After filtration, the resulting product was treated in the similar manner as in Example 66 to obtain 32.0 parts of the copper phthalocyanine pigment.

The pigment has the well known α-type crystal form which shows peaks at the X-ray diffraction angles of $2\theta(CuK_\alpha/Ni)$, of 6.9, 9.0, 10.4, 12.4, 18.0, 18.4, 21.2, 23.6, 26.0, 27.9, and 30.3.

EXAMPLE 68

To a solvent mixture of 15 parts of methanol and 75 parts of chlorobenzene were added with stirring 32 parts of phthalodinitrile, 8.4 parts of cupric chloride, 5.7 parts of sodium hydroxide, and 0.2 part of dimethylglyoxime. Then, 25 parts of a non-ionic activator polyoxyethylene nonyl phenol ether, R Pelletex, N No. 12 (Miyoshi Fat and Oil) was added to the mixture. The reaction was carried out by stirring the mixture at 70° C. for 3 hours. After filtration, the resulting product was treated in the similar manner as in Example 66 to obtain 31.5 parts of the copper phthalocyanine pigment.

The X-ray analysis indicates that the pigment shows the same X-ray diffraction pattern as found in the copper phthalocyanine pigment having the well known α-type crystal form.

EXAMPLE 69

To a solvent mixture of 100 parts of butanol, 20 parts of trichlorobenzene, 10 parts of phenol and 20 parts of ethyleneglycol were added with stirring 32 parts of phthalodinitrile, 12.5 parts of copper acetate, 5.5 parts of sodium hydroxide, 6 parts of urea, and 0.4 part of nitrilotriacetate. The reaction was carried out by stirring the mixture at a temperature in the range of 25 to 30° C. for 3 hours and then in the range of 60 to 65° C. for 2 hours. After filtration, the resulting product was washed with methanol and then with water, and dried to obtain 30.5 parts of the copper phthalocyanine pigment.

The X-ray analysis indicates that the pigment shows the same X-ray diffraction pattern as found in the copper phthalocyanine pigment having the well known β-type crystal form.

EXAMPLE 70

To a solvent mixture of 80 parts of methanol, 20 parts of diethylene glycol ethyl ether, and 60 parts of benzene were added with stirring 32 parts of phthalodinitrile, 6.8 parts of cuprous chloride, 6 parts of sodium hydroxide, 2.5 parts of ethanolamine, and 0.2 part of oxime. The reaction was carried out by stirring the mixture at a temperature in the range of 65 to 70° C. for 3 hours. After filtration, the resulting product was treated in the similar manner as in Example 66 to obtain 32.5 parts of the copper phthalocyanine pigment.

The X-ray analysis indicates that the pigment is a mixture of copper phthalocyanine pigments having the well known α-type and β-type crystal form.

EXAMPLE 71

To 150 parts of methanol were added with stirring 32 parts of phthalodinitrile, 6.8 parts of cuprous chloride, and 5.4 parts of ammonium chloride. The mixture was stirred at room temperature for one hour, and then 4.5 parts of sodium hydroxide and 1 part of pyridine were added slowly to the mixture. After the addition of 0.5 part of dithizone, the reaction was further continued by stirring the mixture under reflux for 3 hours. Then 24 parts of sulfuric acid was slowly added dropwise. The mixture was again stirred for one hour and then under reflux for one hour. After filtration, the resulting product was washed with water and then dispersed into 640 parts of a 0.5% aqueous sodium hydroxide solution, and the mixture was stirred at 95° C. for half an hour, then filtered. The product was washed with water and dried to obtain 33.4 parts of the copper phthalocyanine pigment. The product shows the same crystal form as found in the well known β-type copper phthalocyanine pigment. The pigment has a clear color tone, strong tinting power, and very good dispersing property.

EXAMPLE 72

To 150 parts of methanol were added with stirring 32 parts of phthalodinitrile, 6.8 parts of cuprous chloride, and 5.4 parts of ammonium chloride. The mixture was stirred for one hour, and then 4.5 parts of sodium hydroxide and 1 part of pyridine were slowly added to the mixture. After the subsequent addition of 0.5 part of dithizone, the reaction was further continued by stirring the mixture under reflux for 3 hours. Then 35 parts sulfuric acid was slowly added dropwise. The mixture was stirred for one hour and then under reflux for one hour. After filtration, the resulting product was washed with water and then dispersed into 640 parts of a 0.5% aqueous sodium hydroxide solution, and the mixture was stirred at 95° C. for half an hour, then filtered. The product was washed with water and dried to obtain 33.4 parts of the copper phthalocyanine pigment. The product shows the same crystal form as found in the well known β-type copper phthalocyanine pigment. The pigment has a clearer color tone with slight red, compared with the pigment of Example 71, strong tinting power, and very good dispersing property.

EXAMPLE 73

To 150 parts of ethanol were added with stirring 32 parts of phthalodinitrile, 8.4 parts of nickel chloride, 5.4 parts of ammonium chloride, 6.0 parts of sodium hydroxide, 1.0 part of ethylene diamine tetraacetate, and 2 parts of triethanolamine. The reaction was carried out by stirring the mixture at a temperature in the range of 25 to 30° C. for one hour and then under reflux for 4 hours. Then 10 parts of 98% sulfuric acid was slowly added dropwise, and the mixture was stirred under reflux for 2 hours. After filtration, the resulting product was washed with water and then dispersed into 640 parts of a 1% aqueous sodium carbonate solution, and the mixture was stirred at 95° C. for one hour, then filtered. The product was washed with water and dried to obtain 31.2 parts of the nickel phthalocyanine pigment. The product shows the same crystal form as found in the well known β-type nickel phthalocyanine pigment. The pigment has a clear color tone, strong tinting power, and very good dispersing property.

EXAMPLE 74

To 100 parts of methanol were added with stirring 32 parts of phthalodinitrile, 6.2 parts of cuprous chloride, and 3.0 parts of ammonium chloride. The mixture was stirred for one hour, and after 5 parts of sodium hydroxide were added 1 part of dithizone were added to the mixture. The reaction was further continued by stirring the mixture under reflux for 3 hours. Then, 60 parts of 98% sulfuric acid was slowly added dropwise. The mixture was again stirred for one hour and then under reflux for half an hour. After filtration, the resulting product was washed with water and dispersed into 640 parts of a 1% aqueous sodium hydroxide solution, and the mixture was stirred at 80° C. for one hour then filtered. The product was washed wth water and dried to obtain 33.4 parts of the copper phthalocyanine pigment. The product shows the same crystal form as found in the well known β-type copper phthalocyanine pigment. The pigment has a clearer color tone with deeper red, compared with those of Examples 71 and 72, strong tinting power, and very good dispersing property.

EXAMPLE 75

To 100 parts of methanol were added with stirring 32 parts of phthalodinitrile, 6.2 parts of cuprous chloride, and 3.0 parts of ammonium chloride, and the mixture was stirred for one hour. Then, 5 parts of sodium hydroxide was slowly added. After 0.9 part of glyoxime was added to the mixture, the reaction was continued by stirring the mixture under reflux for 3 hours. Then, 141 parts of 98% sulfuric acid was slowly added dropwise. The mixture was again stirred at room temperature for one hour and then under reflux for half an hour. After filtration, the resulting product was washed with water and dispersed into 640 parts of a 1% aqueous potassium hydroxide solution, and the mixture was stirred at 60° C. for one hour, and then filtered. The product was washed with water and dried to obtain 34.3 parts of the copper phthalocyanine pigment. The product was a mixture of the copper phthalocyanine pigments having the well known β-type and γ-type crystal forms. The pigment has a clear color tone, strong tinting power, and very good dispersing property.

EXAMPLE 76

To 100 parts of methanol were added with stirring 32 parts of phthalodinitrile, 8.4 parts of cupric chloride, and 4 parts of ammonium nitrate. The mixture was stirred for one hour, and then 7 parts of potassium hydroxide was slowly added. After the subsequent addition of 0.8 part of thiourea, the reaction was further continued by stirring the mixture at 40° C. for one hour and then under reflux for 2 hours. Then 100 parts of 98% sulfuric acid was slowly added dropwise. The mixture was again stirred for one hour and then under reflux for 6 hours. After filtration, the resulting product was washed with water and dispersed into 640 parts of a 1% aqueous sodium hydroxide solution, and the mixture was stirred at 80° C. for one hour, then filtered. The production was washed with water and dried to obtain 34.2 parts of the copper phthalocyanine pigment. The product shows the same crystal form as found in the well known γ-type copper phthalocyanine pigment. The pigment has a clear color tone, strong tinting power, and very good dispersing property.

EXAMPLE 77

To 100 parts of ethanol were added with stirring 32 parts of phthalodinitrile, 8.4 parts of cupric chloride, and 4 parts of ammonium acetate. The mixture was stirred for one hour, and then 8 parts of sodium carbonate and 2 parts of sodium hydroxide were added to the mixture. After the subsequent addition of 1 part of dithizone, the reaction was further continued by stirring the mixture at 40° C. for one hour and then under reflux for 3 hours. Then 100 parts of 98% sulfuric acid was slowly added dropwise. The mixture was again stirred fo one hour and and then under reflux for half an hour. After filtration, the resulting product was washed with water and dispersed into 640 parts of a 1% aqueous sodium hydroxide solution, and the mixture was stirred at 80° C. for one hour, then filtered. The product was washed with water and dried to obtain 31.6 parts of the copper phthalocyanine pigment. The product shows the same crystal form as found in the well known γ-type copper phthalocyanine pigment. The pigment has a clear color tone, strong tinting power, and very good dispersing property.

EXAMPLE 78

To 120 parts of methanol were added with stirring 32 parts of phthalodinitrile, 6.2 parts of cuprous chloride, and 5 parts of sodium hydroxide. The reaction was carried out by stirring the mixture of 30° C. for 2.5 hours, and then 40 parts of hydrogen chloride was slowly added. The mixture was further stirred for one hour and then under reflux for one hour. After filtration, the resulting product was washed with water and dispersed into 640 parts of a 0.5% aqueous sodium hydroxide solution, and the mixture was stirred at 95° C. for 0.5 hour, then filtered. The product was washed with water and dried to obtain 33.4 parts of the copper phthalocyanine pigment. The product shows the same crystal form as found in the well known β-type copper phthalocyanine pigment. The pigment has a clear color tone, strong tinting power, and very good dispersing property.

EXAMPLE 79

To 180 parts of polyethylene glycol were added with stirring 32 parts of phthalodinitrile, 8.2 parts of nickel chloride, 2.0 parts of urea, and 5.5 parts of sodium hydroxide. hTe mixture was stirred for one hour, and then 4..9 parts of 1,2-cyclohexanonediamine tetraacetate was slowly added. The reaction was further continued by stirring the mixture at a temperature in the range of 25 to 30° C. for one hour and then in the range of 70 to 75° C. for 3 hours. The reaction mixture was cooled to 50° C., and 20 parts of phosphoric acid was slowly added dropwise. The mixture was again stirred for one hour and at 70° C. for 2 hours. After filtration, the resulting product was washed with hot water, and dispersed into 640 parts of 0.5% aqueous sodium hydroxide solution, and the mixture was stirred at 95° C. for half an hour, then filtered. The product was washed with water and dried to obtain 31 parts of the nickel phthalocyanine pigment. The product shows the same crystal form as found in the well known β-type nickel phthalocyanine pigment. The pigment has a clear color tone, strong tinting power, and very good dispersing property.

EXAMPLE 80

To 120 parts of methanol were added with stirring 32 pats of phthalodinitrile, 6.2 parts of cupric chloride, and 5.0 parts of sodium hydroxide. The mixture was stirred for half an hour, and then 2.5 parts of ammonium chloride and 0.5 part of dimethyl oxime were slowly added to the mixture. The reaction was carried out by stirring the mixture at a temperature in the range of 25 to 30° C. for one hour and then under reflux for 3 hours. Then 98 parts of acetic acid was slowly added dropwise. The mixture was again stirred for one hour and under reflux for 2 hours. After filtration, the resulting product was washed with water and dispersed into 640 parts of 0.5% aqueous sodium hydroxide solution, and the mixture was stirred at 80° C. for one hour, then filtered. The product was washed with water and dried to obtain 33.3 parts of the copper phthalocyanine pigment. The product shows the same crystal form as found in the well known β-type copper phthalocyanine pigment. The pigment has a clear color tone, strong tinting power, and very good dispersing property.

EXAMPLE 81

To 180 parts of methanol were added with stirring 32 parts of phthalodinitrile, 18.2 parts of nickel nitrate, 5.0 parts of ammonium chloride, and 2.0 parts of ammonium acetate. The mixture was stirred for one hour, and then 1 part dithizone and 2 parts of triethanolamine were added slowly to the mixture. After the subsequent addition of 14.0 parts of calcium hydroxide, the reaction was continued by stirring the mixture at a temperature in the range of 25 to 30° C. for one hour and then in the range of 50 to 60° C. for 3 hours. Then, the mixture was cooled to 60° C., and 10 parts of anhydrous phosphoric acid was slowly added dropwise. The mixture was again stirred for 0.5 hour and then at 60° C. for 2 hours. After filtration, the resulting product was washed with water and dispersed into 640 parts of a 0.5% aqueous sodium carbonate solution, and the mixture was stirred at 95° C. for half an hour, then filtered. The product was washed with water and dried to obtain 29.5 parts of the nickel phthalocyanine pigment. The product shows the same crystal form as found in the well known β-type nickel phthalocyanine pigment. The pigment has a clear color tone, strong tinting power, and very good dispersing property.

EXAMPLE 82

To 150 parts of butanol were added with stirring 32 parts of phthalodinitrile 18.2 parts of cobalt nitrate, and 0.5 part of ammonium purpurate. The mixture was stirred for half an hour, and then 2.5 parts of triethanolamine and 5.2 parts of sodium hydroxide were slowly added to the mixture. After the subsequent addition of 1 part of dithizone, the reaction was carried out by stirring the mixture at a temperature in the range of 25 to 30° C. for 5 hours and then in the range of 50 to 60° C. for 3 hours. Then, 15 parts of 35% hydrochloric acid was slowly added dropwise. The mixture was again stirred for half hour and at 60° C. for one hour. After filtration, the resulting product was washed with water and dispersed into 640 parts of a 0.5% aqueous sodium carbonate solution and the mixture was stirred at 95° C. for one hour, then filtered. The product was washed with water and dried to obtain 30.2 parts of the cobalt phthalocyanine pigment. The product shows the same crystal form as found in the well known β-type cobalt phthalocyanine pigment. The pigment has a clear color tone, strong tinting power, and very good dispersing property.

EXAMPLE 83

To 150 parts of methanol were added with stirring 32 parts of phthalodinitrile, 6.2 parts of cuprous chloride, and 5.4 parts of ammonium chloride. Then 4.6 parts of sodium hydroxide and 1 part of pyridine were slowly added to the mixture. After the subsequent addition of 1 part of dithizone and 2 parts of a sodium alkyl aryl sulfonate, the reaction was carried out by stirring the mixture for one hour and under reflux for 5 hours. The reaction mixture was then cooled to 60° C., and 20 parts of 98% sulfuric acid was slowly added dropwise. The mixture was stirred for one hour. Then the reaction mixture was neutralized by the addition of an alkaline substance such as ammonia, filtered, if necessary, to remove impurity materials, and washed with methanol. To this mixture 100 parts of a sodium alkyl sulfonate was added with stirring. After methanol was distilled off under a reduced pressure, there was obtained a composition consisting of the pigment and a surface active agent.

The product, when added to water with stirring, was easily dispersed without deposition of the pigment particles, thus making it suitable for use in pigment printing of fabrics.

EXAMPLE 84

To 150 parts of methanol were added with stirring 32 parts of phthalodinitrile, 8.9 parts of cobalt chloride, and 5 parts of ammonium nitrate. Then 10 parts of sodium hydroxide and 1 part of pyridinine were slowly added to the mixture. After the addition of 1 part of dimethyl glyoxime, the reaction was carried out by stirring the mixture for one hour and then under reflux for 4 hours. The reaction mixture was then cooled to 40° C., and 20 parts of 98% sulfuric acid was slowly added dropwise. After the subsequent addition of 3 parts of dodecylsulfosuccinate, the mixture was stirred under reflux for one hour. The mixture was then treated in the similar manner as in Example 83, and 100 parts of polyoxyethylene lauryl ether was added to the mixture with stirring. After methanol was distilled off under a reduced pressure, there was obtained a composition consisting of the pigment and a surface active agent. When swelled by the impregnation of water and added to aqueous dispersion of acrylic resins or synthetic rubber, the product was highly suitable for pigment printing of various materials to be colored, such as fibers.

EXAMPLE 85

To 150 parts of ethanol were added with stirring 32 parts of phthalodinitrile, 8.6 parts of nickel chloride, and 5.4 parts of ammonium chloride. Then 5 parts of sodium hydroxide, 5 parts of sodium carbonate, and 1 part of pyridine were slowly added to the mixture. After the subsequent addition of a part of dithizone, the reaction was carried out by stirring the mixture for one hour and then under reflux for 3 hours. The mixture then cooled to 60° C., and 20 parts of sulfuric acid was slowly added dropwise. The mixture was stirred under reflux for 3 hours, then treated in the similar manner as in Example 83. To this mixture 10 parts of a polyoxyethylene alkyl phenol was added with stirring. After ethanol was distilled off under a reduced pressure, there was obtained a composition consisting of the pigment and a surface active agent. When the product is added to viscose spinning solutions, suitably colored spinning solutions can be obtained.

EXAMPLE 86

To 150 parts of methanol were added with stirring 32 parts of phthalodinitrile, 8.4 parts of cobalt chloride, and 3 parts of ammonium acetate. Then 6.5 parts of sodium hydroxide and 2 parts of triethanolamine were slowly added to the mixture. After the subsequent addition of a part of thiourea and 2 parts of a polyoxyethylene alkyl phenol, the reaction was carried out by stirring the mixture at room temperature for one hour and then under reflux for 4 hours. The mixture was then cooled to 40° C., and 20 parts of 98% sulfuric acid was slowly added dropwise, and the mixture was stirred under reflux for one hour. The mixture was then treated in the similar manner as in Example 83. After 3 parts of sorbitan diester and 2 parts of trioxystearic glyceride were added to the mixture and methanol was distilled off under a reduced pressure, to obtain a composition consisting of the pigment and a surface active agent.

When the product was added to natural rubber, together with other additives, followed by the mastication of the mixture in a mixing roll, the rubber provides remarkably higher resistance to deterioration than the conventional kinds of rubber. The product is also suitable for coloring of rubber.

EXAMPLE 87

To 150 parts of ethanol were added with stirring 32 parts of phthalodinitrile, 8.4 parts of cupric chloride, and 4 parts of ammonium acetate. Then 5.8 parts of sodium carbonate and 2 parts of sodium hydroxide were slowly added. After the subsequent addition of a part of dithizone, the reaction was carried out by stirring the mixture for one hour and then under reflux for 3 hours. The mixture was then cooled to 60° C., and 15 parts of 98% sulfuric acid was slowly added dropwise. After 0.5 part of a polyoxyethyelne alkyl phenol ether was added, the mixture was stirred under reflux for 1.5 hours, and then treated in the similar manner as in Example 83. After 20 parts of polyoxyethylene alkyl phenol ether was added, ethanol was distilled off with stirring under a reduced pressure, there was obtained a composition consisting of the pigment and a surface active agent.

The product has the dispersability into oil vehicles. Therefore, when dispersed into such solvents as alcohols, benzene, toluene, ketones, and the like, the product is suitable for use in lacquer, plastics, rubber and offset printing.

EXAMPLE 88

To 100 parts of methanol were added with stirring 32 parts of phthalodinitrile, 8.4 parts of cobalt chloride, and 4 parts of ammonium sulfate. The mixture was stirred for one hour. Then 7.5 parts of potassium hydroxide was added slowly to the mixture. After the subsequent addition of 1 part of glyoxime, the reaction was continued by stirring the mixture at 40° C. for one hour and then under reflux for 3 hours. Then, 100 parts of 98% sulfuric acid was slowly added dropwise, and the mixture was stirred for one hour and under reflux for half an hour. The product was washed with water and dried to obtain 41.6 parts of the cobalt phthalocyanine-bi-sulfate.

EXAMPLE 89

To 100 parts of methanol were added with stirring 32 parts of phthalodinitrile, 8.4 parts of cupric chloride, and 4 parts of ammonium acetate. The mixture was stirred for one hour. Then 8 parts of sodium carbonate and 5.5 parts of sodium hydroxide were slowly added to the mixture. After the subsequent addition of 1 part of dithizone, the reaction was continued by stirring the mixture at 40° C. for one hour and then under reflux for 3 hours. The 82 parts of 98% sulfuric acid was slowly added dropwise. The mixture was stirred for one hour and under reflux for half an hour, then filtered. The product was washed with ethanol and dried to obtain 44.7 parts of the copper phthalocyanine bi-sulfate.

EXAMPLE 90

To 100 parts of ethanol were added with stirring 32 parts of phthalodinitrile, 8.6 parts of nickel chloride, and 5.4 parts of ammonium chloride. The mixture was stirred for one hour. Then 5.8 parts of sodium hydroxide and 2 parts of triethanolamine were slowly added to the mixture. After the subsequent addition of 0.8 part of thiourea, the reaction was continued by stirring the mixture at 40° C. for one hour and then under reflux for 4 hours. Then 125 parts of 98% sulfuric acid was added dropwise, and the mixture was further stirred for one hour and under reflux for half an hour, then filtered. The product was washed with water and dried to obtain 40.7 parts of the nickel phthalocyanine bi-sulfate.

EXAMPLE 91

To 120 parts of methanol were added with stirring 32 parts of phthalodinitrile, 2.2 parts of copper powder, and 2.0 parts of cuprous chloride. The mixture was stirred for half an hour. Then 4 parts of ammonium sulfate and 5.0 parts of potassium hydroxide, were slowly added to the mixture. After the subsequent addition of 1 part of glyoxime, the reaction was continued by stirring the mixture at 40° C. for one hour and then under reflux for 2 hours. Then 115 parts of 98% sulfuric acid was slowly added dropwise. The mixture was stirred for one hour and under reflux for half an hour, then filtered. The product was washed with water and dried to obtain 44.5 parts of the copper phthalocyanine bi-sulfate pigment.

EXAMPLE 92

To 120 parts of methanol were added with stirring 43.0 parts of phthalodinitrile, 6.2 parts of cuprous chloride, 3.4 parts of sodium hydroxide, and 0.5 part of dithizone. The reaction was carried out by stirring the mixture at a temperature in the range of 25 to 30° C. for one hour and then under reflux for 3 hours.

After filtration, the resulting product was washed with methanol and then with water, and dried to obtain 36.7 parts of phthalocyanine.

What is claimed is:

1. A method for the production of a metal phthalocyanine pigment which comprises reacting at a temperature within the range of room temperature to 100° C. an o-dinitrile compound of the formula:

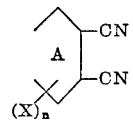

wherein A represents aryl radical or pyridinyl radical; X represents hydrogen, halo, nitro, amino, sulfonic acid, carboxylic acid, alkyl or alkoxy group and $n$ represents an integer of 1–4 with a metallic substance capable of forming a central atom of the phthalocyanine pigment selected from the group consisting of copper powder, cuprous oxide, cupric oxide, cuprous chloride, cupric chloride, cuprous bromide, cupric bromide, copper sulfate, copper nitrate, copper phosphide, copper acetate, copper hydroxide, zinc powder, zinc oxide, zinc chloride, zinc bromide, zinc sulfate, zinc nitrate, zinc carbonate, zinc acetate, tin powder, tin oxide, tin chloride, tin bromide, tin sulfate, tin nitrate, lead powder, lead oxide, lead chloride, lead bromide, lead sulfate, lead nitrate, lead acetate, vanadium powder, vanadium oxide, vanadium chloride, vanadium bromide, vanadium sulfate, chromium powder, chromium oxide, chromium chloride, chromium sulfate, molybdenum powder, molybdenum oxide, molybdenum chloride, molybdenum bromide, manganese powder, manganese oxide, manganese chloride, manganese bromide, manganese sulfate, manganese nitrate, manganese phosphate, iron powder, ferrous chloride, ferric chloride, ferrous bromide, ferric bromide, ferrous phosphate, ferric phosphate, ferrous sulfate, ferric sulfate, ferrous nitrate, ferric nitrate, cobalt powder, cobalt oxide, cobalt chloride, cobalt bromide, cobalt nitrate, nickel powder, nickel oxide, nickel chloride, nickel bromide, nickel nitrate, nickel sulfate, nickel phosphide, nickel acetate, palladium powder, palladium oxide, palladium chloride, palladium bromide, palladium sulfate, palladium nitrate, platinum powder, platinum oxide, platinum chloride, and platinum bromide; in a hydrophilic organic solvent having hydroxy group, selected from the group consisting of methanol, ethanol, propanol, isopropanol, butanol, isobutanol, secondary butanol, ethylene glycol, propylene glycol, polyethylene glycol, methyl cellosolve, ethyl cellosolve, diethyleneglycol ethyl ether, ether, phenol, o-, m-, and p-cresol and mixtures thereof in the presence of an alkaline substance selected from the group consisting of hydroxide, oxide, peroxide and carbonate of alkali metal and of alkaline earth metal, and further in the presence of a compound capable of forming a complex compound with said metallic substance selected from the group consisting of ethylene-diaminetetraacetic acid,
nitrilotriacetic acid,
glycol ether diaminetetraacetic acid,
1-(1-hydroxy-2-naphthylazo)-6-nitro-2-naphthol-4-sulfonic acid,
1-(2-hydroxy-1-naphthylazo)-2-naphthol-4-sulfonic acid,
1-(1-hydroxy-2-naphthylazo)-2-naphthol-4-sulfonic acid,
1-pyridylazo-2-naphthol,
7-(1-naphthylazo)-8-quinolinol-5-sulfonic acid,
4-(4-nitrophenylazo)-2-[N,N'-di(carboxymethyl)aminomethyl]-1-naphthol,
phthalein,
sulfophthalein,
3,3'-bis[N,N'-di-(carboxymethyl)-amino]-o-cresol phthalein,
fluorescein bismethyliminodiacetate,
pyrogallol sulfophthalein,
3''-sulfo-2'',
-6''-dichloro-3,3'-dimethyl-4-hydroxy-fuchsone-5,5'-dicarboxylic acid,
pyrogallol carboxylic acid,
salicyclic acid,
ammonium purpurate,
aziraline-3-sulfonic acid,
thiourea,
diphenyl-thiocarbazone,
dimethylglyoxime,
hematoxyline,
and mixtures thereof.

2. The method of claim 1 wherein said metallic substance is monovalent, said alkaline substance is sodium hydroxide, and wherein the mole ratio of said sodium hydroxide to said o-dinitrile compound is 0.25:1 to 0.5:1.

3. The method of claim 1 wherein said metallic substance is divalent, said alkaline substance is sodium hydroxide, and the mole ratio of said sodium hydroxide to said o-dinitrile compound is from 0.5:1 to 0.75:1.

4. A method of claim 1 wherein the o-dinitrile type compound is a member selected from the group consisting of phthalodinitrile, 2,3-dinitrile pyridine, 3,4-dinitrile diphenyl, 1,2-dinitrile naphthalene, 2,3-dinitrile naphthalene, 2,3-dinitrile anthracene, 2,3-dinitrile phenanthrene, mono-, di-, tri or tetra chlorophthalodinitrile, mono-, di-, tri- or tetrabromophthalodinitrile, mono-, di-, tri- or tetra-iodophthalodinitrile, sulfonic acid-substituted phthalodinitrile, carboxylic acid substituted phthalodinitrile, nitro-substituted phthalodinitrile, amino substituted phthalodinitrile, alkyl-substituted phthalodinitrile alkoxy phthalodinitrile and mixtures thereof.

5. A method of claim 1 wherein in the alkaline substance is a member selected from the group consisting of lithium oxide, lithium peroxide, lithium hydroxide, lithium carbonate, sodium oxide, sodium peroxide, sodium hydroxide, sodium carbonate, potassium oxide, potassium peroxide, potassium hydroxide, potassium carbonate, beryllium oxide, beryllium hydroxide, magnesium oxide, magnesium hydroxide, calcium oxide, calcium peroxide, calcium hydroxide, strontium oxide, strontium peroxide, strontium hydroxide, barium oxide, barium peroxide, barium hydroxide, and mixtures thereof.

6. The method of claim 1 wherein said metallic substance is copper.

7. The method of claim 1 wherein said metallic substance is nickel.

8. The method of claim 1 wherein said metallic substance is cobalt.

9. The method of claim 1 wherein said metallic substance is molybdenum.

10. The method of claim 1 wherein said metallic substance is tin.

11. The method of claim 1 wherein the mole ratio of said o-dinitrile compound to said metallic substance is 1:at about 0.25, the mole ratio of said o-dinitrile compound to said alkaline substance is from 1:0.1 to 1:2, and the weight ratio of said compound capable of forming a complex compound is from 0.1 to 10.0 parts per part of the o-dinitrile compound.

12. The method of claim 1 which comprises reacting at a temperature lower than 70° C.

13. The method of claim 1 wherein the weight ratio of said compound capable of forming a complex compound is from 0.1 to 10 parts per part of the o-dinitrile compound.

14. The method of claim 1 wherein the weight ratio of said compound capable of forming a complex compound is from 0.2 to 5.0 parts per part of the o-dinitrile compound.

15. The method of claim 1 wherein the mole ratio of said o-dinitrile compound to said metallic substance is 1:at least 0.25.

16. The method of claim 1 wherein the mole ratio of said o-dinitrile compound to said alkaline substance is from 1:0.1 to 1:2.

References Cited
UNITED STATES PATENTS

| | | | |
|---|---|---|---|
| 2,681,348 | 6/1954 | Brooks | 260—314.5 |
| 2,280,507 | 4/1942 | Bienert et al. | 260—314.5 |
| 2,276,598 | 3/1942 | Stocker et al. | 260—314.5 |
| 2,840,568 | 6/1958 | Brouillard et al. | 260—314.5 |
| 2,524,672 | 10/1950 | Lecher et al. | 260—314.5 |
| 2,318,787 | 5/1943 | Lacey | 260—314.5 |
| 2,160,837 | 6/1939 | Detrick | 260—314.5 |
| 2,286,679 | 6/1942 | Heilbron et al. | 260—314.5 |

HARRY I. MOATZ, Assistant Examiner

U.S. Cl. X.R.

8—1 XA; 106—23, 288, 292, 297, 302, 304; 260—145 A, 145 B, 146 R